United States Patent
Patel et al.

(10) Patent No.: US 11,625,395 B2
(45) Date of Patent: Apr. 11, 2023

(54) METHODS AND SYSTEMS FOR UNDETERMINED QUERY ANALYTICS

(71) Applicant: QlikTech International AB, Lund (SE)

(72) Inventors: Akash Patel, Ottawa (CA); Steven Pressland, Kent (GB); Mohsen Rais-Ghasem, Ottawa (CA)

(73) Assignee: QlikTech International AB, Lund (SE)

( * ) Notice: Subject to any disclaimer, the term of this patent is extended or adjusted under 35 U.S.C. 154(b) by 111 days.

(21) Appl. No.: 17/157,591

(22) Filed: Jan. 25, 2021

(65) Prior Publication Data

US 2022/0237194 A1 Jul. 28, 2022

(51) Int. Cl.
*G06F 16/2453* (2019.01)

(52) U.S. Cl.
CPC .............. *G06F 16/24534* (2019.01)

(58) Field of Classification Search
CPC ......... G06F 16/24534; G06F 16/24539; G06F 16/24556
See application file for complete search history.

(56) References Cited

U.S. PATENT DOCUMENTS

| | | |
|---|---|---|
| 2002/0099692 A1 | 7/2002 | Shah et al. |
| 2007/0094236 A1* | 4/2007 | Otter .............. G06F 16/283 |
| 2010/0274756 A1 | 10/2010 | Inokuchi et al. |
| 2012/0130940 A1 | 5/2012 | Gattani et al. |
| 2013/0262279 A1* | 10/2013 | Finley ............... G06Q 40/10 705/31 |
| 2018/0144064 A1* | 5/2018 | Krasadakis ....... G06F 16/90332 |
| 2022/0035802 A1* | 2/2022 | Penzo ............... G06F 16/3344 |

FOREIGN PATENT DOCUMENTS

WO    WO-00/72201 A1    11/2000

OTHER PUBLICATIONS

European Search Report dated Jun. 21, 2022 by European Patent Office for EP Application No. 22153253.4 (Applicant-QlikTech International AB) (7 Pages).

* cited by examiner

*Primary Examiner* — Grace Park
(74) *Attorney, Agent, or Firm* — Ballard Spahr LLP

(57) ABSTRACT

Set analysis may be used to determine the best data analysis model(s) (e.g., data charts, data tables, data graphs, data maps, graphical objects, key performance indicators (KPIs), etc.) for representing the results of an undetermined query (e.g., an imprecise query, an undefined query, an incomplete query, a partially expressed query, a portioned query, etc.).

20 Claims, 17 Drawing Sheets

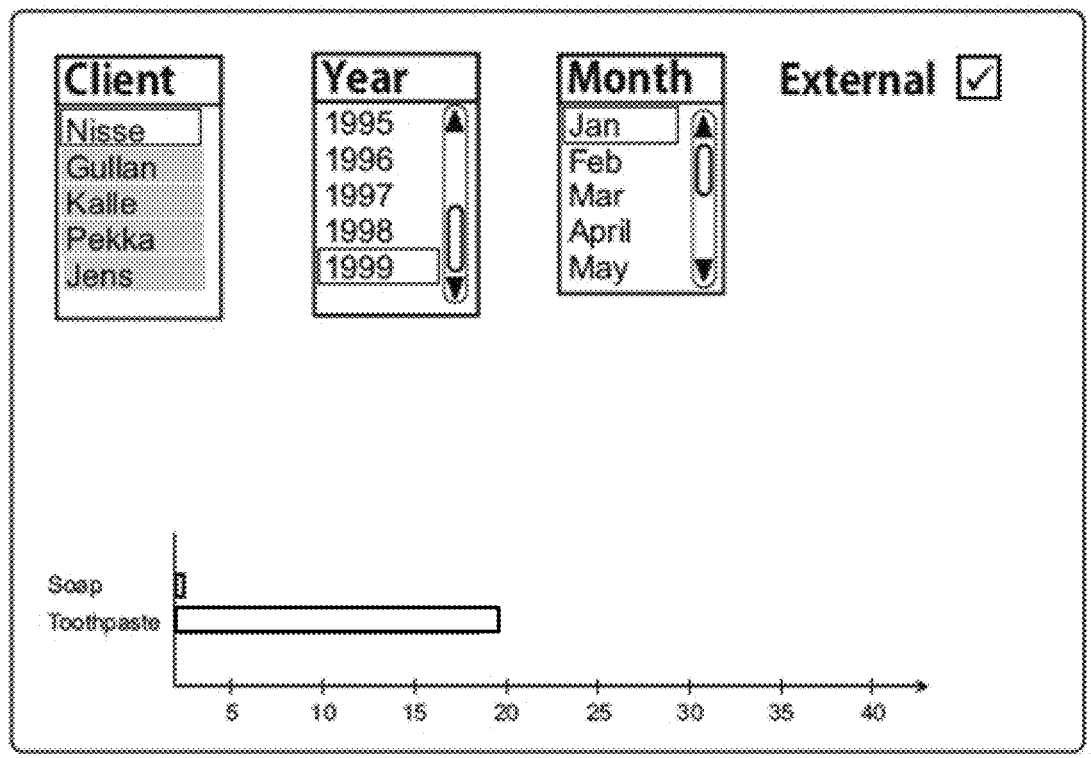

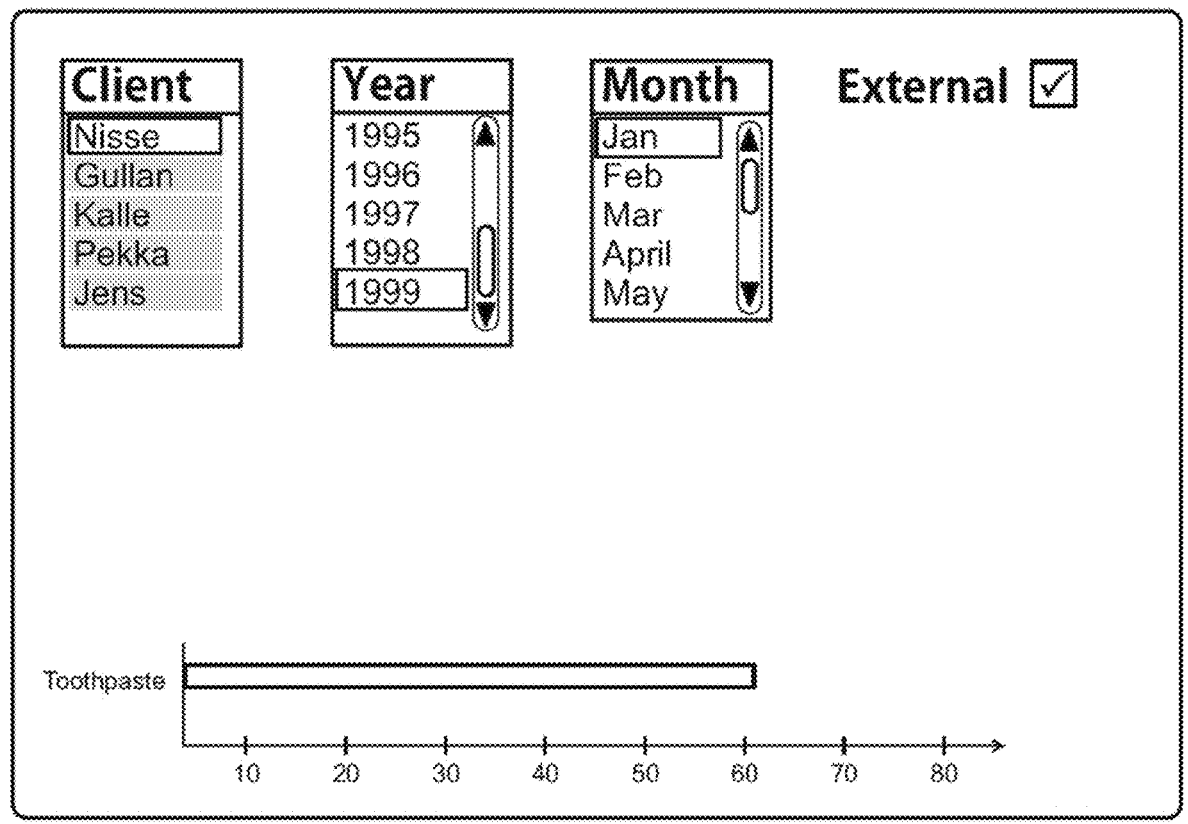

FIG. 10
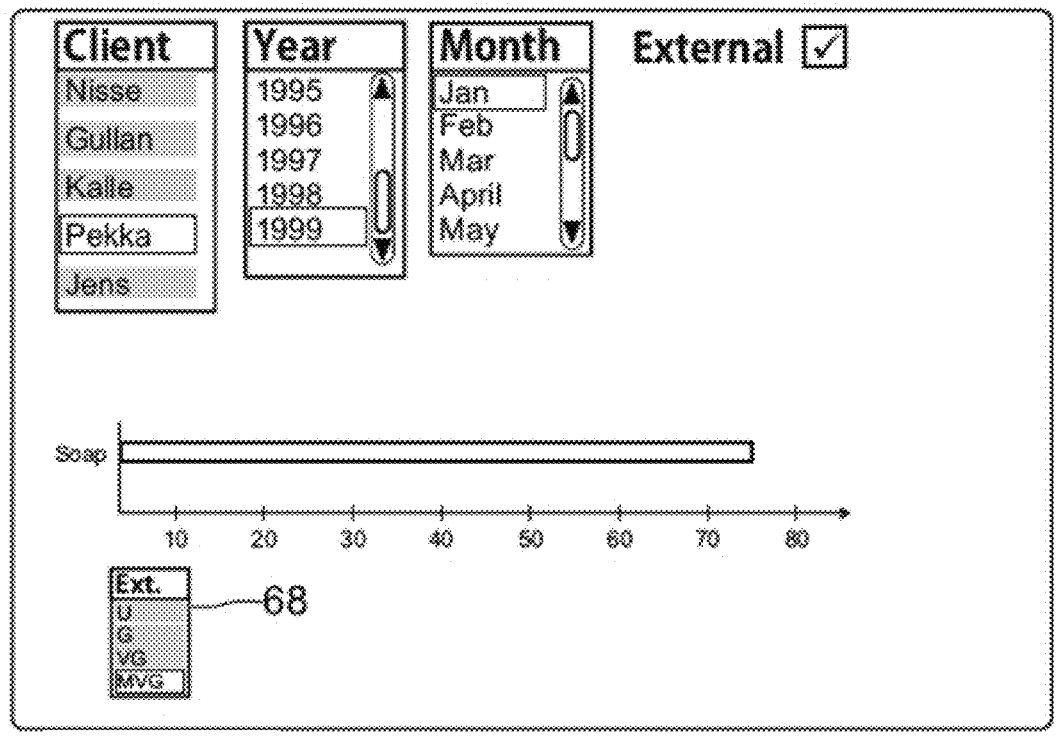
FIG. 11
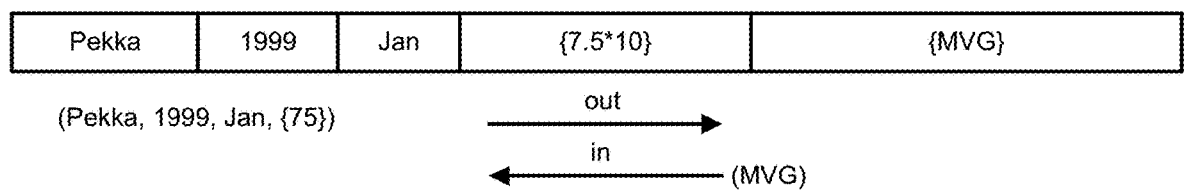
FIG. 12
| Client | Year | Month | Sum(Price*Number) | ExtQualification(Sum(Price*Number)) |
|---|---|---|---|---|
| Nisse | 1999 | Jan. | 19.5 | G |
| Kalle | 1999 | Jan. | 60 | VG |
| Gullan | 1999 | Jan. | 37.5 | VG |
| Jens | × | × | × | U |
| Pekka | 1999 | Jan. | 75 | MVG |

METHODS AND SYSTEMS FOR UNDETERMINED QUERY ANALYTICS

SUMMARY

It is to be understood that both the following general description and the following detailed description are exemplary and explanatory only and are not restrictive, as claimed. Provided are methods and systems for undetermined query analytics.

The methods described may include receiving undetermined query information, determining, based on the undetermined query information, one or more data constraints and one or more data analysis models, determining, based on the one or more data constraints, an aggregated dataset, determining, based on the aggregated dataset and the one or more data analysis models, an optimal data analysis model, and causing an output of the optimal data analysis model. The optimal data analysis model may indicate at least a portion of the aggregated dataset.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 6 is a schematic graphical presentation showing selections and a diagram of data associated to the selections as received after processing by an external engine;

FIG. 7 is a schematic representation of data exchanged with an external engine based on selections in FIG. 6;

FIG. 8 is a schematic graphical presentation showing selections and a diagram of data associated to the selections as received after second computations from an external engine;

FIG. 9 is a schematic representation of data exchanged with an external engine based on selections in FIG. 8;

FIG. 10 is a schematic graphical presentation showing selections and a diagram of data associated to the selections as received after third computations from an external engine;

FIG. 11 is a schematic representation of data exchanged with an external engine based on selections in FIG. 10;

FIG. 12 is a table showing results from computations based on different selections in the presentation of FIG. 10;

DETAILED DESCRIPTION

Figure 1:
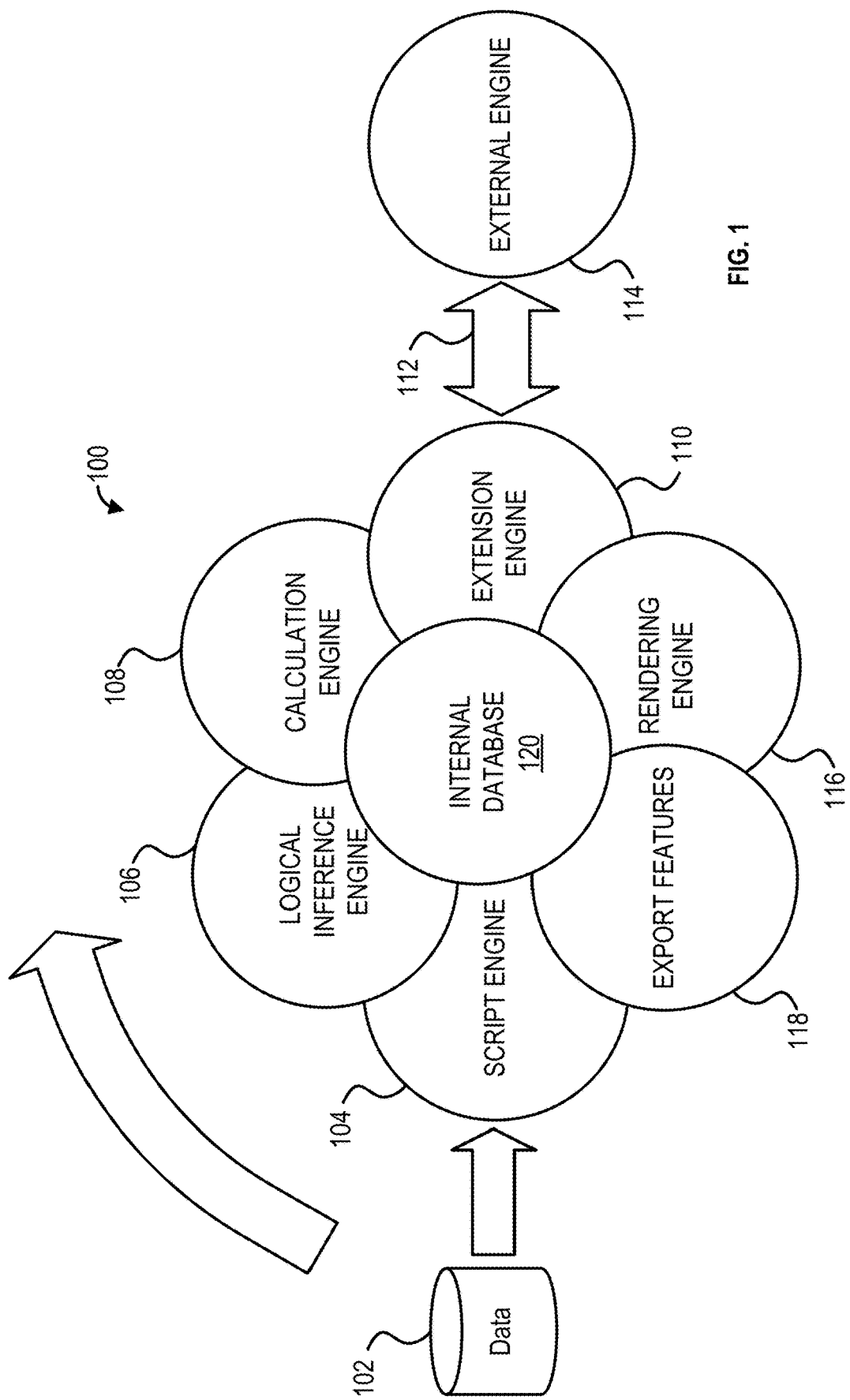
FIG. 1 is a schematic diagram showing an embodiment of a system forming an implementation of the disclosed methods.

Before the present methods and systems are disclosed and described in more detail, it is to be understood that the methods and systems are not limited to specific steps, processes, components, or structure described, or to the order or particular combination of such steps or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers or steps. "Exemplary" means "an example of", but not essential, necessary, or restricted or limited to, nor does it convey an indication of a preferred or ideal embodiment. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that is exemplary.

Steps and components described herein as being used to perform the disclosed methods and construct the disclosed systems are exemplary unless the context clearly dictates otherwise. It is to be understood that when combinations, subsets, interactions, groups, etc. of these steps and components are disclosed, that while specific reference of each various individual and collective combinations and permutation of these may not be explicitly disclosed, each is specifically contemplated and described herein, for all methods and systems. This applies to all aspects of this application including, but not limited to, steps in disclosed methods and/or the components disclosed in the systems. Thus, if there are a variety of additional steps that can be performed or components that can be added, it is understood that each of these additional steps can be performed and components added with any specific embodiment or combination of embodiments of the disclosed systems and methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked, or cloud-based.

Embodiments of the methods and systems are described below with reference to diagrams, flowcharts, and other illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to computer-implemented methods and systems for undetermined query analytics. A computing device (e.g., a computer, a cloud-based device, a server, a smart device, etc.) may receive, for example, via a user interface, a query. The query may be, for example, an undetermined query (e.g., an imprecise query, an undefined query, an incomplete query, a partially expressed query, a portioned query, etc.). The computing device may be configured to analyze the query based on aggregation functions that are qualified to operate on a subset of data records (e.g., rather than a current selection of data records and/or a total selection of data records, etc.).

The computing device may perform set analysis (e.g., set expression analysis, etc.) on any undetermined query to determine and/or define an aggregation set. To define an aggregation set for an undetermined query, the computing device may consider and/or account for items (e.g., compositional elements, predicates, etc.), constraints (e.g., data constraints, logical constraints, etc.) of the query, and one or more data analysis models (e.g., data charts, data tables, data graphs, data maps, graphical objects, key performance indicators (KPIs), etc.). For example, the computing device may determine how each input item and/or computational element fits a data analysis model based on the data analysis model's capacity and/or projectability of an item (e.g., whether it has any condition, whether the condition results on one or multiple values, etc.). For example, the computing device may determine an optimal data analysis model from one or more data analysis models determined from an undetermined query that best fits each input item and/or computational element.

For example, the computing device may receive each of the following undetermined business-related queries:

Query 1: Sales by product where sales>2000
Query 2: Products with sales>2000
Query 3: Number of products with sales>2000

Query 1, Query 2, and Query 3, each include similar (e.g., conceptually similar, etc.) items (e.g., compositional elements, predicates, etc.), such as "sales," "products," ">2000," and/or the like. The computing device may, for example, use natural language parsing and/or metadata analysis to determine the items and/or any constraints of the query, such as a default analysis period, a required data/element selection, and/or the like. The computing device may determine/perform a different set analysis for Query 1, Query 2, Query 3, and/or any other undetermined query based on, for example, an order/arrangement of items (and/or constraints) of the query and/or the composition (e.g., dimensions, measures, etc.) of one or more data analysis models (e.g., data charts, data tables, data graphs, data maps, graphical objects, key performance indicators (KPIs), etc.). The computing device may determine/perform a different set analysis for Query 1, Query 2, and Query 3 (and/or any other query) according to novel algorithms described herein.

FIG. 1 shows an example associative data indexing engine 100. The associative data indexing engine 100 may determine and/or generate a response to a query. The query may be, for example, an undetermined query (e.g., an imprecise query, an undefined query, an incomplete query, a partially expressed query, a portioned query, etc.). The associative data indexing engine 100 may analyze the query based on one or more novel aggregation functions, for example, aggregation functions that are qualified to operate on a subset of data records (e.g., rather than a current selection of data records and/or a total selection of data records, etc.) and output a response. The response may be, for example, a visualization and/or one or more data analysis models (e.g., data charts, data tables, data graphs, data maps, graphical objects, key performance indicators (KPIs), etc.) that best fit aggregated data associated with the query.

FIG. 1 shows the associative data indexing engine 100 with data flowing in from the left and operations starting from a script engine 104 and going clockwise (indicated by the clockwise arrow) to export features 118. Data from a data source 102 can be extracted by a script engine 104. The data source 102 can comprise any type of known database and/or data store, such as relational databases, post-relational databases, object-oriented databases, hierarchical databases, flat files, spreadsheets, etc. The Internet may also be regarded as a database in the context of the present disclosure. A visual interface can be used as an alternative or combined with a script engine 104. The script engine 104 can read record by record from the data source 102 and data can be stored or appended to symbol and data tables in an internal database 120. Read data can be referred to as a data set.

In an aspect, the extraction of the data can comprise extracting an initial data set or scope from the data source 102, e.g. by reading the initial data set into the primary memory (e.g. RAM) of the computer. The initial data set can comprise the entire contents of the data source 102, or a subset thereof. The internal database 120 can comprise the extracted data and symbol tables. Symbol tables can be created for each field and, in one aspect, can only contain the distinct field values, each of which can be represented by their clear text meaning and a bit filled pointer. The data tables can contain said bit filled pointers.

In the case of a query, such as an undetermined query (e.g., an imprecise query, an undefined query, an incomplete query, a partially expressed query, a portioned query, etc.), of the data source 102, a scope can be defined by the tables included in a SELECT statement (or equivalent) and how these are joined. In an aspect, the SELECT statement can be SQL (Structured Query Language) based. For an Internet search, the scope can be an index of found web pages, for example, organized as one or more tables. A result of scope definition can be a data set.

Once the data has been extracted, a user interface can be generated to facilitate dynamic display of the data. By way of example, a particular view of a particular dataset or data subset generated for a user can be referred to as a data space or a session. The methods and systems can dynamically generate one or more visual representations of the data to present in the state space.

A user can make a selection in the data set, causing a logical inference engine 106 to evaluate a number of filters on the data set. For example, a query on a database that holds data of placed orders, could be requesting results matching an order year of '1999' and a client group be 'Nisse.' The selection may thus be uniquely defined by a list of included fields and, for each field, a list of selected values or, more generally, a condition. Based on the selection, the logical inference engine 106 can generate a data subset that represents a part of the scope. The data subset may thus contain a set of relevant data records from the scope, or a list of references (e.g. indices, pointers, or binary numbers) to these relevant data records. The logical inference engine 106 can process the selection and can determine what other selections are possible based on the current selections. In an aspect, flags can enable the logical inference engine 106 to work out the possible selections. By way of example, two flags can be used: the first flag can represent whether a value is selected or not, the second can represent whether or not a value selection is possible. For every click in an application, states and colors for all field values can be calculated. These can be referred to as state vectors, which can allow for state evaluation propagation between tables.

The logical inference engine 106 can utilize an associative model to connect data. In the associative model, all the fields in the data model have a logical association with every other field in the data model. An example, data model 501 is shown in FIG. 5B. The data model 501 illustrates connections between a plurality of tables that represent logical associations. Depending on the amount of data, the data model 501 can be too large to be loaded into memory. To address this issue, the logical inference engine 106 can generate one or more indexes for the data model. The one or more indexes can be loaded into memory instead of the data model 501. The one or more indexes can be used as the associative model. An index is used by database management programs to provide quick and efficient associative access to a table's records. An index is a data structure (for example, a B-tree, a hash table, and the like) that stores attributes (e.g., values) for a specific column in a table. A B-tree is a self-balancing tree data structure that keeps data sorted and allows searches, sequential access, insertions, and deletions in logarithmic time. The B-tree is a generalization of a binary search tree in that a node can have more than two children. A hash table (also referred to as a hash index) can comprise a collection of buckets organized in an array. A hash function maps index keys to corresponding buckets in the hash index.

Figure 2:
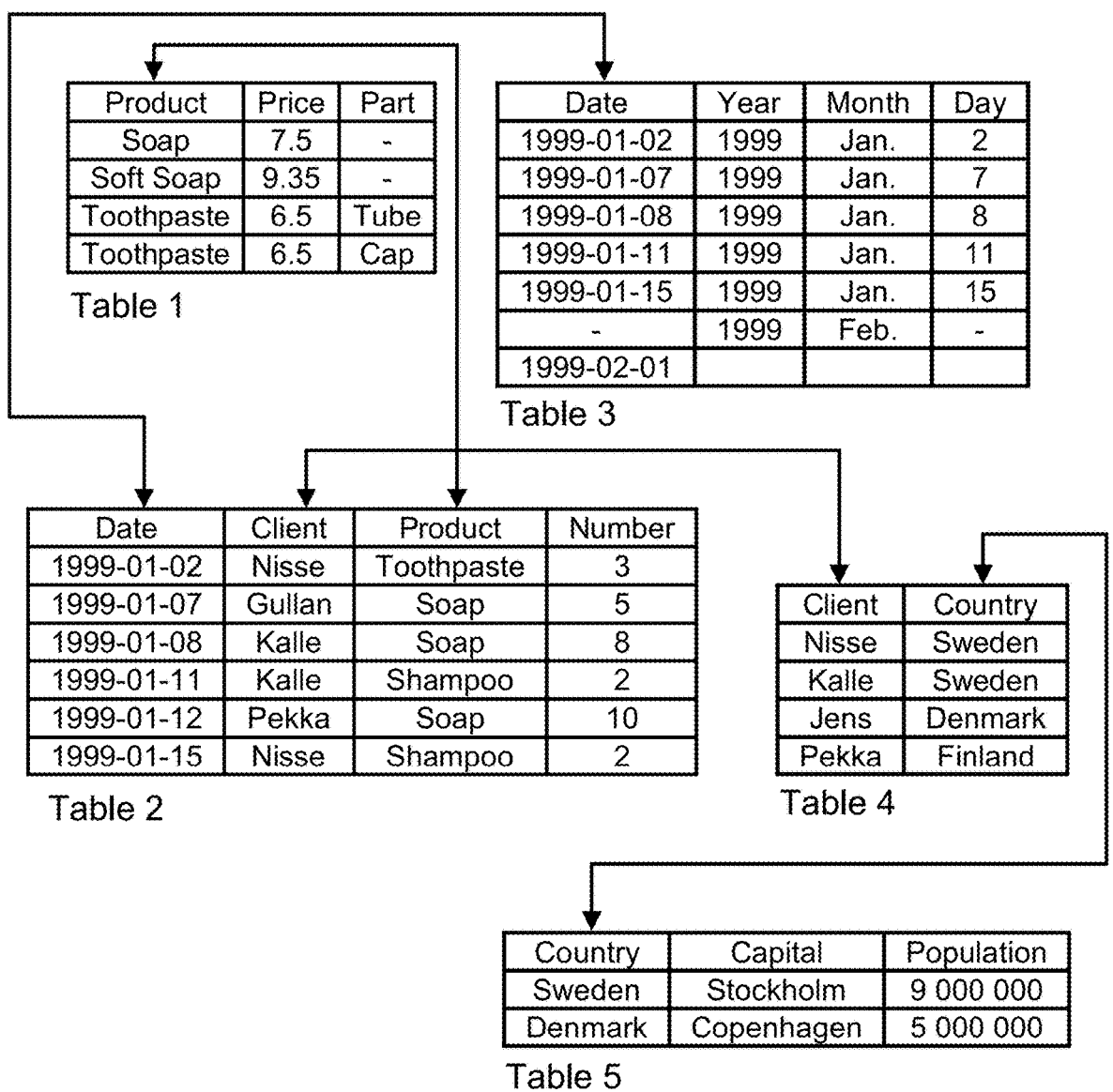
FIG. 2 is a set of tables showing exemplary Tables 1-5 of a simple database and associations between variables in the tables.

An example database, as shown in FIG. 2, can comprise a number of data tables (Tables 1-5). Each data table can contain data values of a number of data variables. For example, in Table 1 each data record contains data values of the data variables "Product," "Price," and "Part." If there is no specific value in a field of the data record, this field is considered to hold a NULL-value. Similarly, in Table 2 each data record contains values of the variables "Date," "Client," "Product," and "Number." In Table 3 each data record contains values of variable "Date" as "Year," "Month" and "Day." In Table 4 each data record contains values of variables "Client" and "Country," and in Table 5 each data record contains values of variables "Country," "Capital," and "Population." Typically, the data values are stored in the form of ASCII-coded strings, but can be stored in any form.

Queries that compare for equality to a string can retrieve values very fast using a hash index. For instance, referring to the tables of FIG. 2, a query of SELECT*FROM Table 2 WHERE Client='Kalle' could benefit from a hash index created on the Client column. In this example, the hash index would be configured such that the column value will be the key into the hash index and the actual value mapped to that key would just be a pointer to the row data in Table 2. Since a hash index is an associative array, a typical entry can comprise "Kalle=>0x29838", where 0x29838 is a reference to the table row where Kalle is stored in memory. Thus, looking up a value of "Kalle" in a hash index can return a reference to the row in memory which is faster than scanning Table 2 to find all rows with a value of "Kalle" in the Client column. The pointer to the row data enables retrieval of other values in the row.

As shown in FIG. 5B, the logical inference engine 106 can be configured for generating one or more bidirectional table indexes (BTI) 502a, 502b, 502c, 502d, and/or 502e and one or more bidirectional associative indexes (BAI) 503a, 503b, 503c and/or 503d based on a data model 501. The logical inference engine 106 can scan each table in the data model 501 and create the BTI 502a, 502b, 502c, 502d, and/or 502e. A BTI can be created for each column of each table in the data. The BTI 502*a*, 502*b*, 502*c*, 502*d*, and/or 502*e* can comprise a hash index. The BTI 502*a*, 502*b*, 502*c*, 502*d*, and/or 502*e* can comprise first attributes and pointers to the table rows comprising the first attributes. For example, referring to the tables of FIG. 2, an example BTI 502*a* can comprise "Kalle=>0x29838", where Kalle is an attribute found in Table 2 and 0x29838 is a reference to the row in Table 2 where Kalle is stored in memory. Thus, the BTI 502*a*, 502*b*, 502*c*, 502*d*, and/or 502*e* can be used to determine other attributes in other columns (e.g., second attributes, third attributes, etc.) in table rows comprising the first attributes. Accordingly, the BTI can be used to determine that an association exists between the first attributes and the other attributes.

The logical inference engine 106 can scan one or more of BTI 502*a*, 502*b*, 502*c*, 502*d*, and/or 502*e* and create the BAI 503*a*, 503*b*, 503*c* and/or 503*d*. The BAI 503*a*, 503*b*, 503*c*, and/or 503*d* can comprise a hash index. The BAI 503*a*, 503*b*, 503*c*, and/or 503*d* can comprise an index configured for connecting attributes in a first table to common columns in a second table. The BAI 503*a*, 503*b*, 503*c*, and/or 503*d* thus allows for identification of rows in the second table which then permits identification of other attributes in other tables. For example, referring to the tables of FIG. 2, an example BAI 503*a* can comprise "Kalle=>0x39838", where Kalle is an attribute found in Table 2 and 0x39838 is a reference to a row in Table 4 that contains Kalle. In an aspect, the reference can be to a hash that can be in-memory or on disk.

Using the BTI 502*a*, 502*b*, 502*c*, 502*d*, and/or 502*e* and the BAI 503*a*, 503*b*, 503*c*, and/or 503*d*, the logical inference engine 106 can generate an index window 504 by taking a portion of the data model 501 and mapping it into memory. The portion of the data model 501 taken into memory can be sequential (e.g., not random). The result is a significant reduction in the size of data required to be loaded into memory.

In an aspect, bidirectional indexing using BTIs can have limits as to how much parallelization can be applied when processing the data model 501. To improve parallelization applied to the data model 501, the logical inference engine 106 can generate bidirectional indexes for partitions for a table in the data model 501. Such bidirectional indexes are hereinafter referred to as "indexlets." In an aspect, the logical inference engine 106 can generate indexlets for a given table by partitioning the table into blocks of rows. In an aspect, the blocks of rows can be of a same size. In an aspect, a last block of rows can be of a size less than the remaining blocks of rows. In an aspect, after partitioning the blocks of rows, the logical inference engine can generate an indexlet for each of the blocks of rows. In an aspect, generating an indexlet for a given block of rows comprises generating a bidirectional index as described above, but limited in scope to the given block of rows.

Provided the input data sources, the logical inference engine 106 can implement an indexation process (e.g., symbol indexation) to generates the indexlets. Indexlets thus generated can serve as a foundation for providing bi-directional indexing information for the both inferencing and/or hypercube domain calculation techniques.

Given an input data source 102 in an interpretable format, e.g., CSV, the indexation process can begin with partitioning the data source 102 into disjoint, same-sized blocks of rows. In some aspects, the indexation process will not partition the last row (e.g., the size of the last block might be smaller than the size of the other blocks). These "slices" of the data can be then processed independently to generate intermediate indexlet structures. Intermediate indexlet structures can be processed sequentially to generate a global symbol map. In addition to bi-directional information (symbol to row and row to symbol), a mapping between the symbols can reside locally in the indexlet and in the global symbol map. This mapping enables a simple yet fast and efficient transformation between symbols in an indexlet and in global symbol maps and vice versa through select and rank operations on bit vectors.

There are two main challenges to the indexation process: parallelization of the creation of intermediate indexlet structures and the creation and handling of large global symbol maps that contain potentially billions of symbols.

The indexation process can be divided into two components: an indexer service and a global symbol service. While the indexer service handles an indexation request as well as distributing tasks of creating the intermediate indexlet structures, the global symbol service enables splitting global symbol maps across machines. Even in good hash map implementations, there is always overhead in memory consumption due to the management of the internal data structure. As result, the ability to split global symbol maps across machines helps to share the load as well as supporting both horizontal and vertical scaling when dealing with large data set.

To achieve the maximum parallelization of the creation of intermediate indexlet structures, the indexer service can utilize a distributed computing environment. A master node can comprise information regarding the capability of worker nodes registered during their initialization. On receiving an indexation request, the master node distributes tasks to worker nodes based on the registered capability. In this setup, more worker nodes can be dynamically added and registered with the master node to reduce the required creation time of the intermediate indexlet structures. Moreover, if a worker node dies during the process, a new worker node can be instantiated and registered to the master node to take over the corresponding tasks. The master node can also communicate with a global symbol master node to get global symbol maps initialized and ready for the global symbol service.

When dealing with large data sets, global symbol maps can comprise billions of symbols. Naturally, an in-memory hash map can provide better performance on both look up and insert operations in comparison to file-based hash map implementations. Unfortunately, it is not practical to have an unlimited amount of physical memory available. Although virtual memory can help to elevate the limitation of physical memory, the performance of lookup and insert operations degrades dramatically.

A global symbol service is provided in which global symbol maps are split across machines to share the load as well as the stress on memory requirements while achieving the desired performance.

Figure 4:
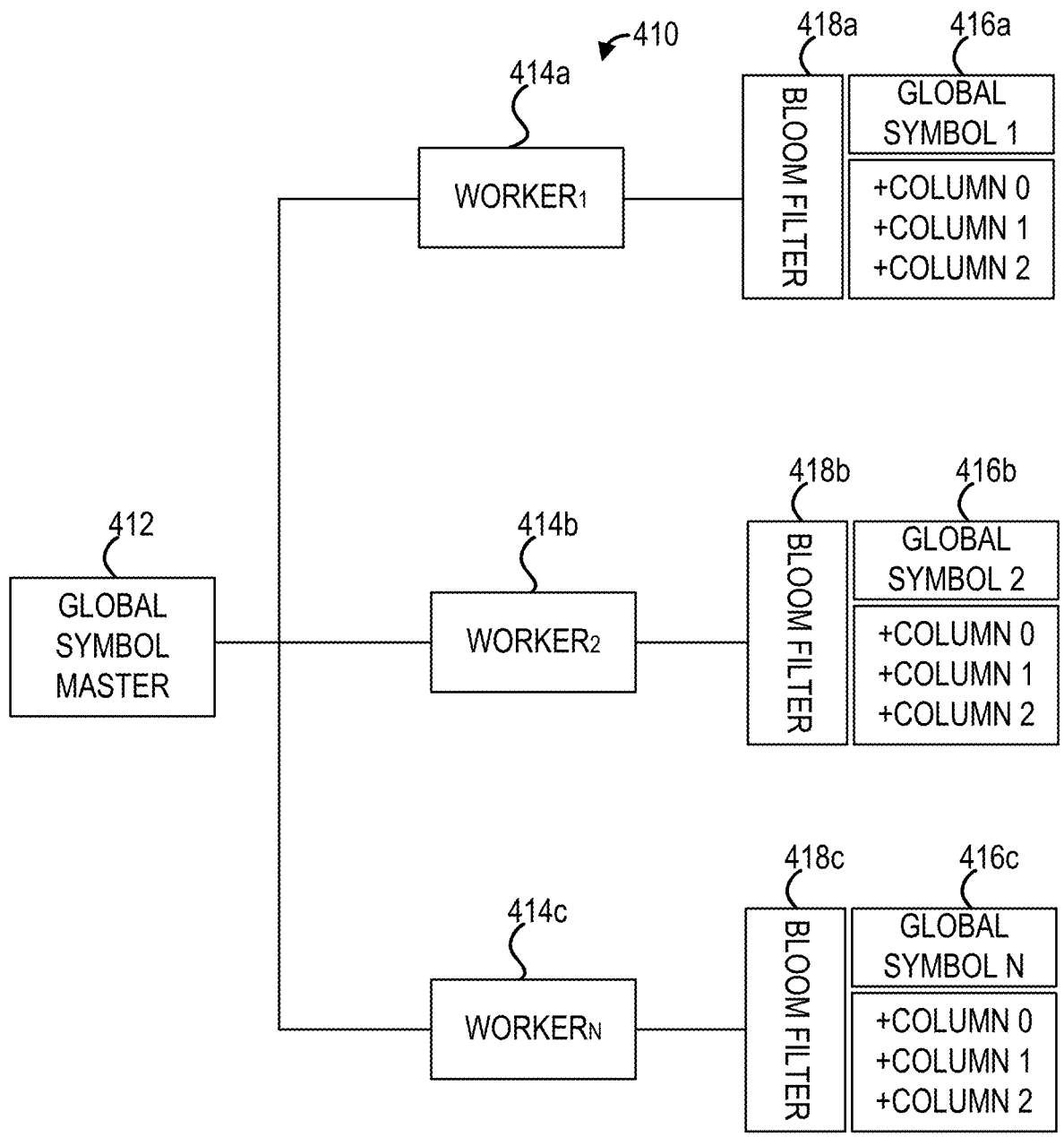
FIG. 4 illustrates an example global symbol service.

FIG. 4 illustrates a global symbol service 410. During an initialization process, worker nodes 414*a*, 414*b*, and 414*c* register their capabilities, e.g., amount of memory, processing power, bandwidth, etc., with a global master node 412. On receiving an indexation request, for example from the indexer master node 402, the global symbol master node 412 can request initialization of global symbol maps 416*a*, 416*b*, and 416*c* on worker nodes 414*a*, 414*b*, and 414*c* based on the registered capabilities. As a result, the global symbol maps 416*a*, 416*b*, and 416*c* are initialized, and proper capability is reserved accordingly.

The indexer service and the global symbol service can generate intermediate indexlet structures and process the intermediate indexlet structures sequentially to generate the global symbol maps together with bi-directional indexing information. This constraint on processing order permits fast and efficient mappings between symbols that reside locally in an indexlet and the global symbol maps. The global symbol service allows parallelism to improve indexation performance.

For example, a state, S, can be introduced into the global symbol maps 416a, 416b, and 416c on the worker nodes 414a, 414b, and 414c as follows S={standing_by, serving, closed}
where "standing_by" indicates that the global symbol map on the worker node is not in use, "serving" indicates that the global symbol map on the worker node can be used for both lookup and insert operations, "closed" indicates that the global symbol map on the worker node is full, and, thus, only supports a lookup operation.

The creation of the global symbol map can start with inserting symbols into a serving hash map on the corresponding worker node. When the optimal capacity of the hash map is reached, the corresponding worker node informs the global symbol master node and changes its state to closed. The global symbol master node can then request another worker node to handle the upcoming tasks, e.g., changing the state of a hash map from "standing_by" to "serving." On subsequent processes, lookup operations can be carried out in a bulk and in a parallelized manner on a closed hash map to maximize the performance. The remaining new symbols can then be inserted into the serving hash map on the corresponding worker node. If a worker node in "standing_by" state dies during the process, it can be replaced by instantiating another worker node that registers itself to the master node. If a worker node in "closed" or "serving" state dies, it can be replaced by either another worker node in "standing_by" state or a newly instantiated worker node. In this case, the master node informs the indexer service and the range of the corresponding data will be indexed again to reconstruct the corresponding hash map.

In an aspect, a Bloom filter 418a, 418b, and 418c can be used to further optimize lookup performance. A Bloom filter is a probabilistic data structure that can indicate whether an element either definitely is not in the set or may be in the set. In other words, false-positive matches are possible, but false negatives are not. The base data structure of a Bloom filter is a bit vector. On a very large hash map that contains several billion symbols, the performance of the lookup operation can degrade dramatically as the size increases. The Bloom filter is a compact data structure that can represent a set with an arbitrarily large number of elements. The Bloom filter enables fast querying of the existence of an element in a set. Depending on the registered resource information, the false positive rate can be specified to achieve both the compactness of the Bloom filter and the minimum access to the hash map. A Bloom filter can improve the performance of lookup operation on closed hash map by 3 to 5 times. The constructed Bloom filter 418a, 418b, and 418c can be used to minimize the amount of communication required in the inferencing as well as hypercube domain construction process. Particularly, by performing lookup operations in the Bloom filters 418a, 418b, and 418c first, the number of hash maps that possibly contain the desired information will be minimized, and, thus, reduce the number of requests that need to be transferred through the network.

The indexer service and the global symbol service allows both local as well as cloud-based deployment of symbol indexation. With the cloud-based deployment, more resources can be added to improve the indexation process. The indexation process is bounded by the amount of resources and the available bandwidth. In large-scale deployment, direct communication between indexer worker nodes 404a, 404b, and 404c and global symbol worker nodes 414a, 414b, and 414c can be setup to reduce the load on the global symbol master node 412.

Figure 5A:
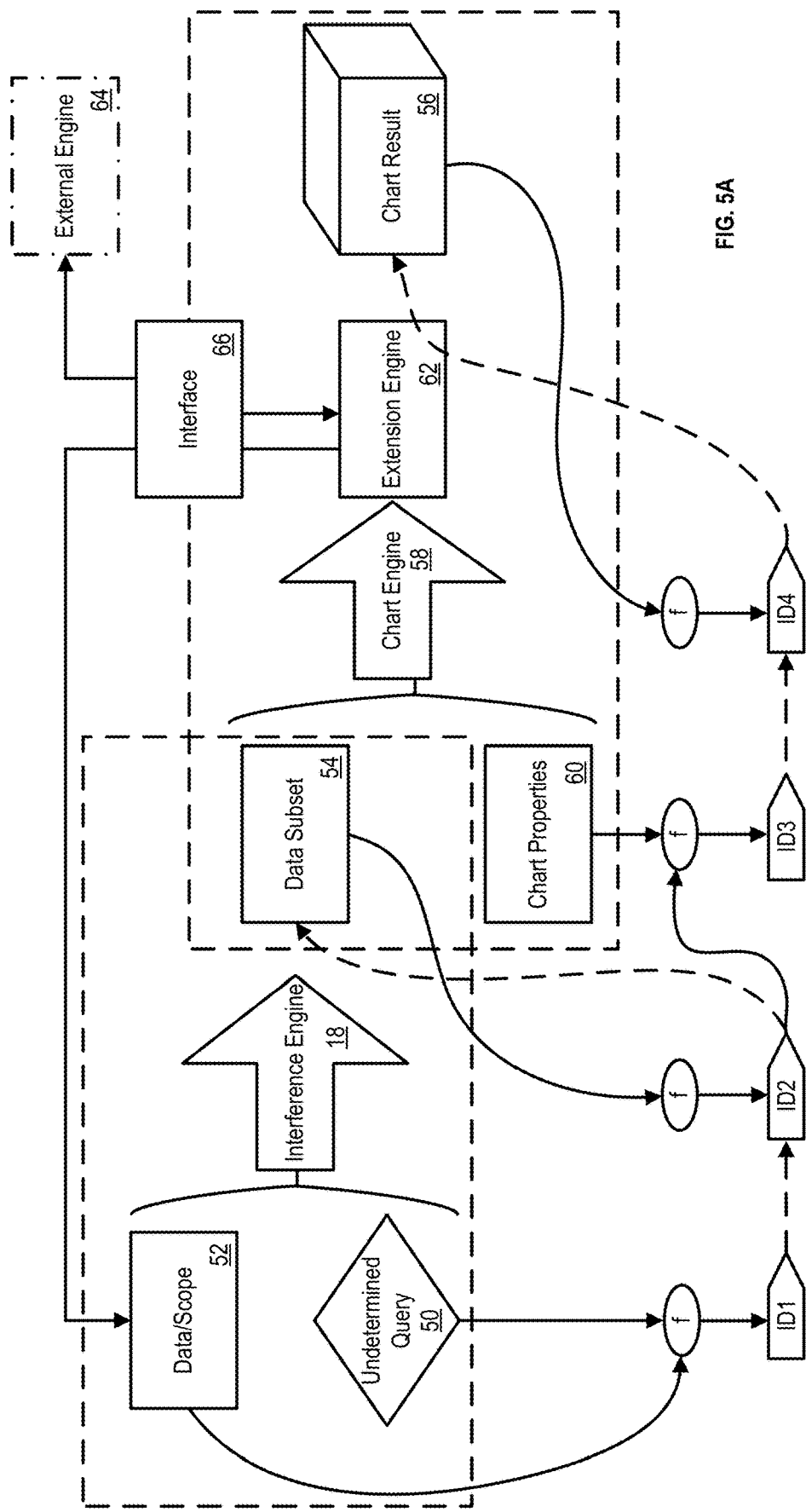
FIG. 5A is a schematic diagram showing how an undetermined query operates on a scope to generate a data subset.
Figure 5B:
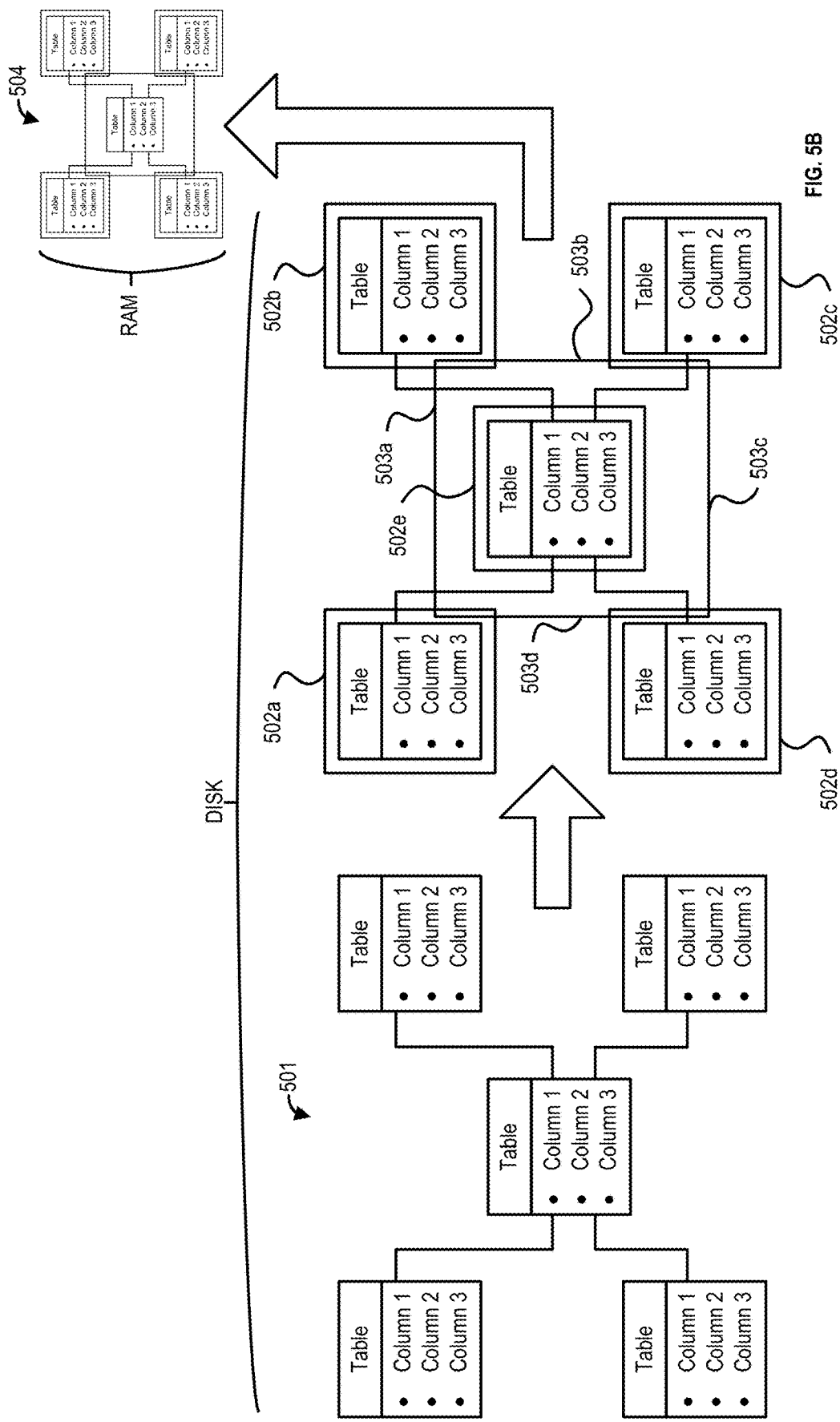
FIG. 5B is an overview of the relations between data model, indexes in disk and windowed view of disk indexes in memory.
Figure 5C:
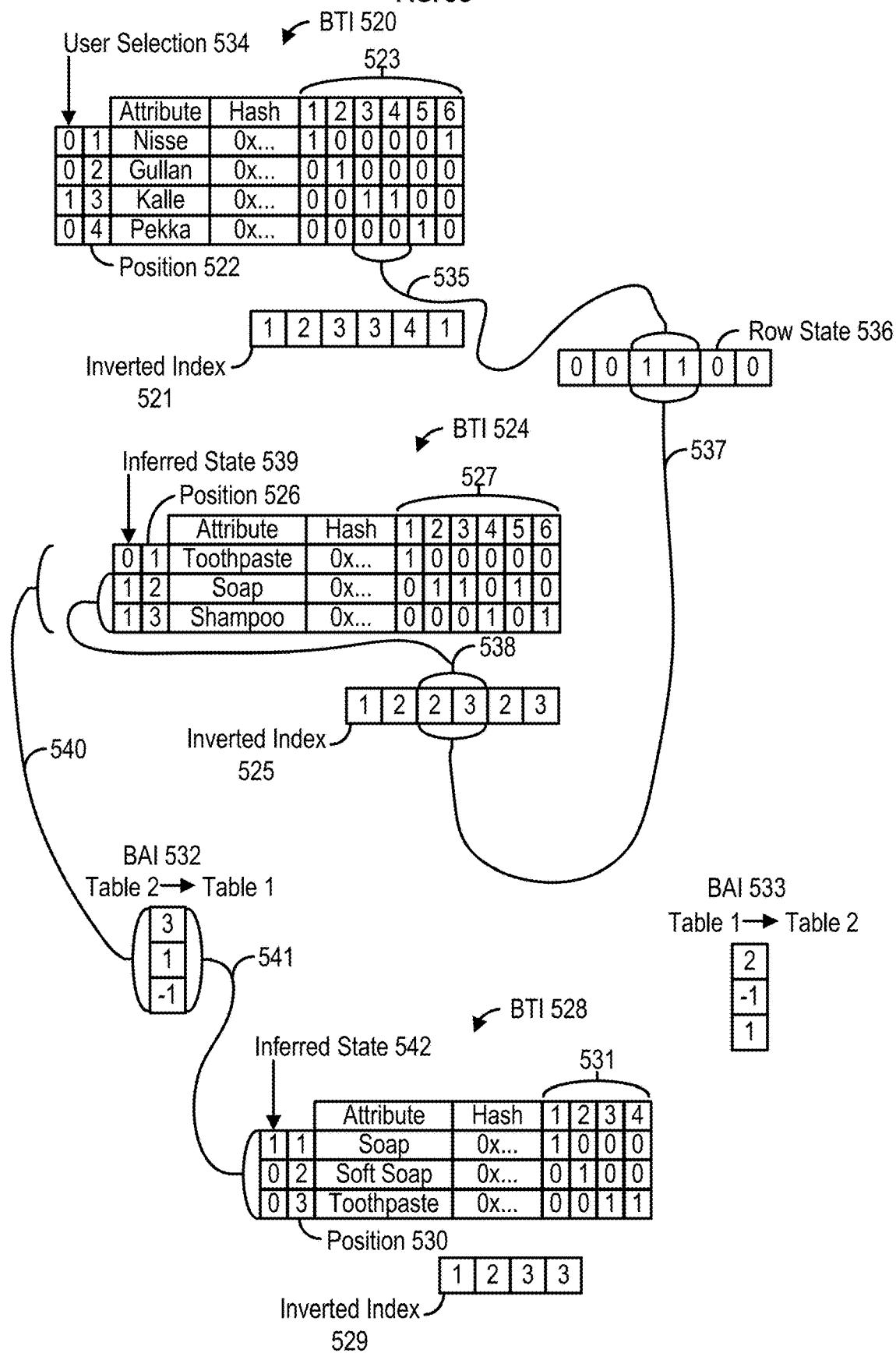
FIG. 5C illustrates an example application of bidirectional table indexes and bidirectional association indexes.
Figure 5D:
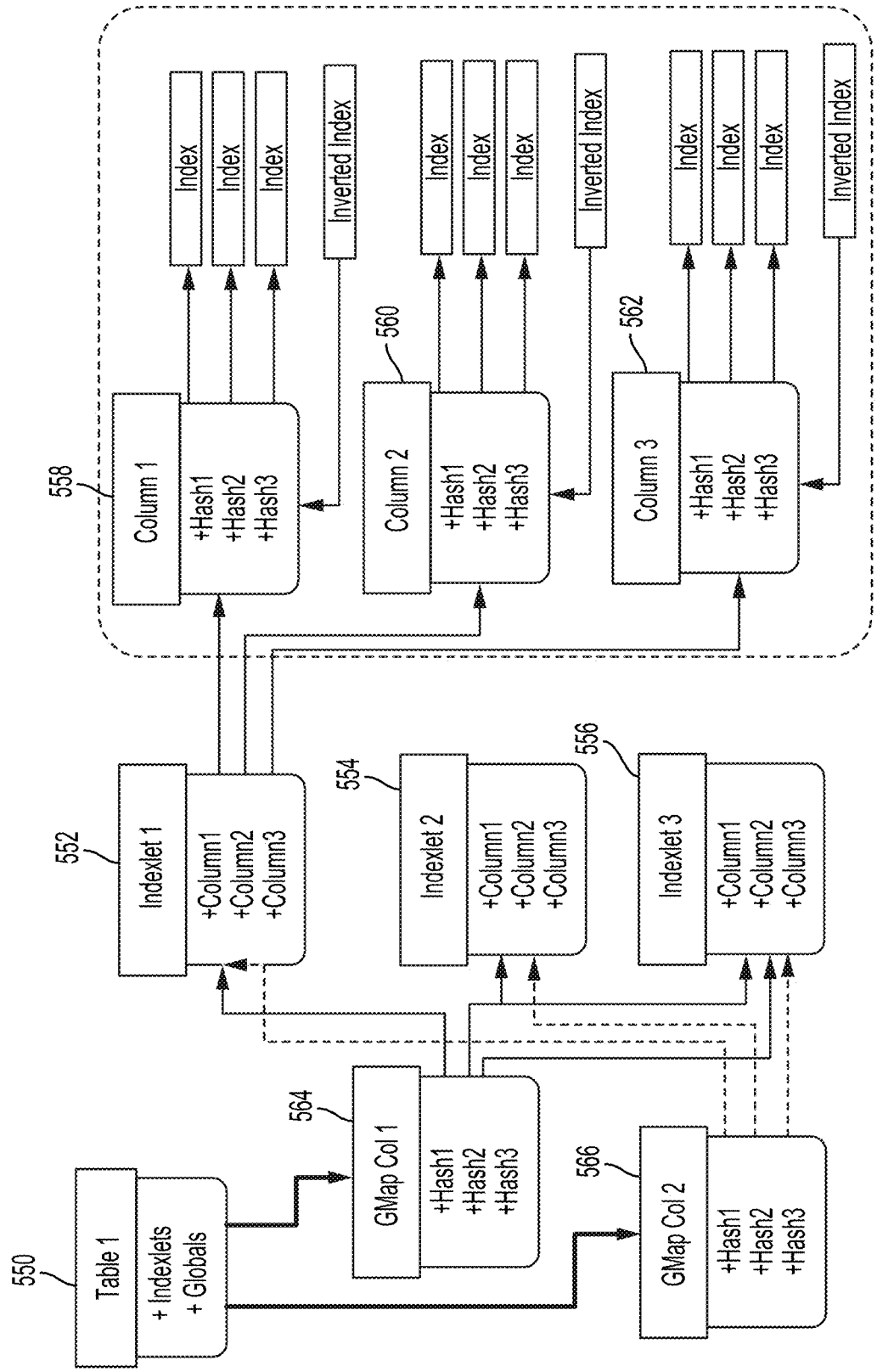
FIG. 5D is a representation of the data structure used for indexlets.

A representation of a data structure for indexlets is shown in FIG. 5D. Rows of a given table 550 can be divided into block bidirectionally indexed by indexlets 552, 554, and 556, respectively. In the example of FIG. 5D, the indexlet 552 can include pointers or references to respective columns 558, 560, and 562 as set forth above with respect to bidirectional table indexes. Each of the indexlets 552, 554, and 556 are logically associated with a bidirectional global attribute lists 564 and 566 that index a particular attribute to the blocks it is present in. Accordingly, an entry in the bidirectional global attribute list 564 and 566 for a given attribute can comprise a reference to an indexlet corresponding to a block having the respective attribute. In an aspect, the reference can include a hash reference. In an aspect, as shown in FIG. 5F, an implicit relationship exists between indexlets in different tables through a common field present in both tables and an attribute-to-attribute (A2A) index.

Thus, the logical inference engine 106 can determine a data subset based on user selections. The logical inference engine 106 automatically maintains associations among every piece of data in the entire data set used in an application. The logical inference engine 106 can store the binary state of every field and of every data table dependent on user selection (e.g., included or excluded). This can be referred to as a state space and can be updated by the logical inference engine 106 every time a selection is made. There is one bit in the state space for every value in the symbol table or row in the data table, as such the state space is smaller than the data itself and faster to query. The inference engine will work associating values or binary symbols into the dimension tuples. Dimension tuples are normally needed by a hypercube to produce a result.

The associations thus created by the logical inference engine 106 means that when a user makes a selection, the logical inference engine 106 can resolve (quickly) which values are still valid (e.g., possible values) and which values are excluded. The user can continue to make selections, clear selections, and make new selections, and the logical inference engine 106 will continue to present the correct results from the logical inference of those selections. In contrast to a traditional join model database, the associative model provides an interactive associative experience to the user.

FIG. 5C illustrates an example application of BTI's and BAI's to determine inferred states both inter-table and intra-table using Table 1 and Table 2 of FIG. 2. A BTI 520 can be generated for the "Client" attribute of Table 2. In an aspect, the BTI 520 can comprise an inverted index 521. In other aspect, the inverted index 521 can be considered a separate structure. The BTI 520 can comprise a row for each unique attribute in the "Client" column of Table 2. Each unique attribute can be assigned a corresponding position 522 in the BTI 520. In an aspect, the BTI 520 can comprise a hash for each unique attribute. The BTI 520 can comprise a column 523 for each row of Table 2. For each attribute, a "1" can indicate the presence of the attribute in the row and a "0" can indicate an absence of the attribute from the row. "0" and "1" are merely examples of values used to indicate presence or absence. Thus, the BTI 520 reflects that the attribute "Nisse" is found in rows 1 and 6 of Table 2, the attribute "Gullan" is found in row 2 of Table 2, the attribute "Kalle" is found in rows 3 and 4 of Table 2, and the attribute "Pekka" is found in row 5 of Table 2.

The inverted index 521 can be generated such that each position in the inverted index 521 corresponds to a row of Table 2 (e.g., first position corresponds to row 1, second position corresponds to row 2, etc. . . . ). A value can be entered into each position that reflects the corresponding position 522 for each attribute. Thus, in the inverted index 521, position 1 comprises the value "1" which is the corresponding position 522 value for the attribute "Nisse", position 2 comprises the value "2" which is the corresponding position 522 value for the attribute "Gullan", position 3 comprises the value "3" which is the corresponding position 522 value for the attribute "Kalle", position 4 comprises the value "3" which is the corresponding position 522 value for the attribute "Kalle", position 5 comprises the value "4" which is the corresponding position 522 value for the attribute "Pekka", and position 6 comprises the value "1" which is the corresponding position 522 value for the attribute "Nisse".

A BTI 524 can be generated for the "Product" attribute of Table 2. In an aspect, the BTI 524 can comprise an inverted index 525. In other aspect, the inverted index 525 can be considered a separate structure. The BTI 524 can comprise a row for each unique attribute in the "Product" column of Table 2. Each unique attribute can be assigned a corresponding position 526 in the BTI 524. In an aspect, the BTI 524 can comprise a hash for each unique attribute. The BTI 524 can comprise a column 527 for each row of Table 2. For each attribute, a "1" can indicate the presence of the attribute in the row and a "0" can indicate an absence of the attribute from the row. "0" and "1" are merely examples of values used to indicate presence or absence. Thus, the BTI 524 reflects that the attribute "Toothpaste" is found in row 1 of Table 2, the attribute "Soap" is found in rows 2, 3, and 5 of Table 2, and the attribute "Shampoo" is found in rows 4 and 6 of Table 2.

By way of example, the inverted index 525 can be generated such that each position in the inverted index 525 corresponds to a row of Table 2 (e.g., first position corresponds to row 1, second position corresponds to row 2, etc.). A value can be entered into each position that reflects the corresponding position 526 for each attribute. Thus, in the inverted index 525, position 1 comprises the value "1" which is the corresponding position 526 value for the attribute "Toothpaste", position 2 comprises the value "2" which is the corresponding position 526 value for the attribute "Soap", position 3 comprises the value "2" which is the corresponding position 526 value for the attribute "Soap", position 4 comprises the value "3" which is the corresponding position 526 value for the attribute "Shampoo", position 5 comprises the value "2" which is the corresponding position 526 value for the attribute "Soap", and position 6 comprises the value "3" which is the corresponding position 526 value for the attribute "Shampoo."

By way of example, a BTI 528 can be generated for the "Product" attribute of Table 1. In an aspect, the BTI 528 can comprise an inverted index 529. In other aspect, the inverted index 529 can be considered a separate structure. The BTI 528 can comprise a row for each unique attribute in the "Product" column of Table 1. Each unique attribute can be assigned a corresponding position 530 in the BTI 528. In an aspect, the BTI 528 can comprise a hash for each unique attribute. The BTI 528 can comprise a column 531 for each row of Table 1. For each attribute, a "1" can indicate the presence of the attribute in the row and a "0" can indicate an absence of the attribute from the row. "0" and "1" are merely examples of values used to indicate presence or absence. Thus, the BTI 528 reflects that the attribute "Soap" is found in row 1 of Table 1, the attribute "Soft Soap" is found in row 2 of Table 1, and the attribute "Toothpaste" is found in rows 3 and 4 of Table 1.

By way of example, the inverted index 529 can be generated such that each position in the inverted index 529 corresponds to a row of Table 1 (e.g., first position corresponds to row 1, second position corresponds to row 2, etc. . . . ). A value can be entered into each position that reflects the corresponding position 530 for each attribute. Thus, in the inverted index 529, position 1 comprises the value "1" which is the corresponding position 530 value for the attribute "Soap", position 2 comprises the value "2" which is the corresponding position 530 value for the attribute "Soft Soap", position 3 comprises the value "3" which is the corresponding position 530 value for the attribute "Toothpaste", and position 4 comprises the value "3" which is the corresponding position 530 value for the attribute "Toothpaste".

By way of example, a BAI 532 can be generated as an index between the product attribute of Table 2 and Table 1. The BAI 532 can comprise a row for each unique attribute in the BTI 524 by order of corresponding position 526. The value in each row can comprise the corresponding position 530 of the BTI 528. Thus, position 1 of the BAI 532 corresponds to "Toothpaste" in the BTI 524 (corresponding position 526 of 1) and comprises the value "3" which is the corresponding position 530 for "Toothpaste" of the BTI 528. Position 2 of the BAI 532 corresponds to "Soap" in the BTI 524 (corresponding position 526 of 2) and comprises the value "1" which is the corresponding position 530 for "Soap" of the BTI 528. Position 3 of the BAI 532 corresponds to "Shampoo" in the BTI 524 (corresponding position 526 of 3) and comprises the value "−1" which indicates that the attribute "Shampoo" is not found in Table 1.

By way of example, a BAI 533 can be created to create an index between the product attribute of Table 1 and Table 2. The BAI 533 can comprise a row for each unique attribute in the BTI 528 by order of corresponding position 530. The value in each row can comprise the corresponding position 526 of the BTI 524. Thus, position 1 of the BAI 533 corresponds to "Soap" in the BTI 528 (corresponding position 530 of 1) and comprises the value "2" which is the corresponding position 526 for "Soap" of the BTI 524. Position 2 of the BAI 533 corresponds to "Soft Soap" in the BTI 528 (corresponding position 530 of 2) and comprises the value "−1" which indicates that the attribute "Soft Soap" is not found in Table 2. Position 3 of the BAI 533 corresponds to "Toothpaste" in the BTI 528 (corresponding position 530 of 3) and comprises the value "1" which is the corresponding position 526 for "Toothpaste" of the BTI 524.

FIG. 5C illustrates an example application of the logical inference engine 106 utilizing the BTI 520, the BTI 524, and the BTI 528. A user can select the "Client" "Kalle" from within a user interface. A column for a user selection 534 of "Kalle" can be indicated in the BTI 520 comprising a value for each attribute that reflects the selection status of the attribute. Thus, the user selection 534 comprises a value of "0" for the attribute "Nisse" indicating that "Nisse" is not selected, the user selection 534 comprises a value of "0" for the attribute "Gullan" indicating that "Gullan" is not selected, the user selection 534 comprises a value of "1" for the attribute "Kalle" indicating that "Kalle" is selected, and the user selection 534 comprises a value of "0" for the attribute "Pekka" indicating that "Pekka" is not selected.

The BTI 520 can be consulted to determine that the attribute "Kalle" has a value of "1" in the column 523 corresponding to rows 3 and 4. In an aspect, the inverted index 521 can be consulted to determine that the user selection 534 relates to the position 522 value of "3" which is found in the inverted index 521 at positions 3 and 4, implicating rows 3 and 4 of Table 1. Following path 535, a row state 536 can be generated to reflect the user selection 534 as applied to the rows of Table 2. The row state 536 can comprise a position that corresponds to each row and a value in each position reflecting whether a row was selected. Thus, position 1 of the row state 536 comprises the value "0" indicating that row 1 does not contain "Kalle", position 2 of the row state 536 comprises the value "0" indicating that row 2 does not contain "Kalle", position 3 of the row state 536 comprises the value "1" indicating that row 3 does contain "Kalle", position 4 of the row state 536 comprises the value "1" indicating that row 4 does contain "Kalle", position 5 of the row state 536 comprises the value "0" indicating that row 5 does not contain "Kalle", and position 6 of the row state 536 comprises the value "0" indicating that row 6 does not contain "Kalle".

Following path 537, the row state 536 can be compared with the inverted index 525 to determine the corresponding position 526 contained in the inverted index 525 at positions 3 and 4. The inverted index 525 comprises the corresponding position 526 value of "2" in position 3 and the corresponding position 526 value of "3" in position 4. Following path 538, the corresponding position 526 values of "2" and "3" can be determined to correspond to "Soap" and "Shampoo" respectively in the BTI 524. Thus, the logical inference engine 106 can determine that both "Soap" and "Shampoo" in Table 2 are associated with "Kalle" in Table 2. The association can be reflected in an inferred state 539 in the BTI 524. The inferred state 539 can comprise a column with a row for each attribute in the BTI 524. The column can comprise a value indicated the selection state for each attribute. The inferred state 539 comprises a "0" for "Toothpaste" indicating that "Toothpaste" is not associated with "Kalle", the inferred state 539 comprises a "1" for "Soap" indicating that "Soap" is associated with "Kalle", and inferred state 539 comprises a "1" for "Shampoo" indicating that "Shampoo" is associated with "Kalle".

Following path 540, the inferred state 539 can be compared to the BAI 532 to determine one or more associations between the selection of "Kalle" in Table 2 and one or more attributes in Table 1. As the inferred state 539 comprises a value of "1" in both position 2 and position 3, the BAI 532 can be assessed to determine the values contained in position 2 and position 3 of the BAI 532 (following path 541). Position 2 of the BAI 532 comprises the value "1" which identifies the corresponding position 530 of "Soap" and position 3 of the BAI 532 comprises the value "−1" which indicates that Table 1 does not contain "Shampoo". Thus, the logical inference engine 106 can determine that "Soap" in Table 1 is associated with "Kalle" in Table 2. The association can be reflected in an inferred state 542 in the BTI 528. The inferred state 542 can comprise a column with a row for each attribute in the BTI 528. The column can comprise a value indicated the selection state for each attribute. The inferred state 542 comprises a "1" for "Soap" indicating that "Soap" is associated with "Kalle", the inferred state 542 comprises a "0" for "Soft Soap" indicating that "Soft Soap" is not associated with "Kalle", and the inferred state 542 comprises a "0" for "Toothpaste" indicating that "Toothpaste" is not associated with "Kalle". Based on the current state of BTIs and BAIs, if the data sources 102 indicate that an update or delta change has occurred to the underlying data, the BTIs and BAIs can be updated with corresponding changes to maintain consistency.

In aspects implementing indexlets, the logical inference engine 106 can apply query language by first performing intra-table inferencing on respective tables. Intra-table inferencing comprises transferring the imposed state of one field to other fields within the same table. In an aspect, intra-table inferencing can comprise computing the union of the index of the active attributes in a user input 504. The intersection of the result of the union operation and record states (i.e. row states 510) is then determined. This result is then intersected with the attribute states 514 of other columns using the inverted index 512. If other selection vectors from a previously provided user input vector 504 has zero active entries, a conflict can be detected. In an aspect, the logical inference engine 106 can resolve the detected conflict. In an aspect, resolving a conflict can include deleting or otherwise eliminating one or more incompatible selections. In another aspect, resolving a conflict can include reverting the data model 501 or a portion of the data model 501, e.g. a table, record, or attribute, to a previous state.

Figure 5E:
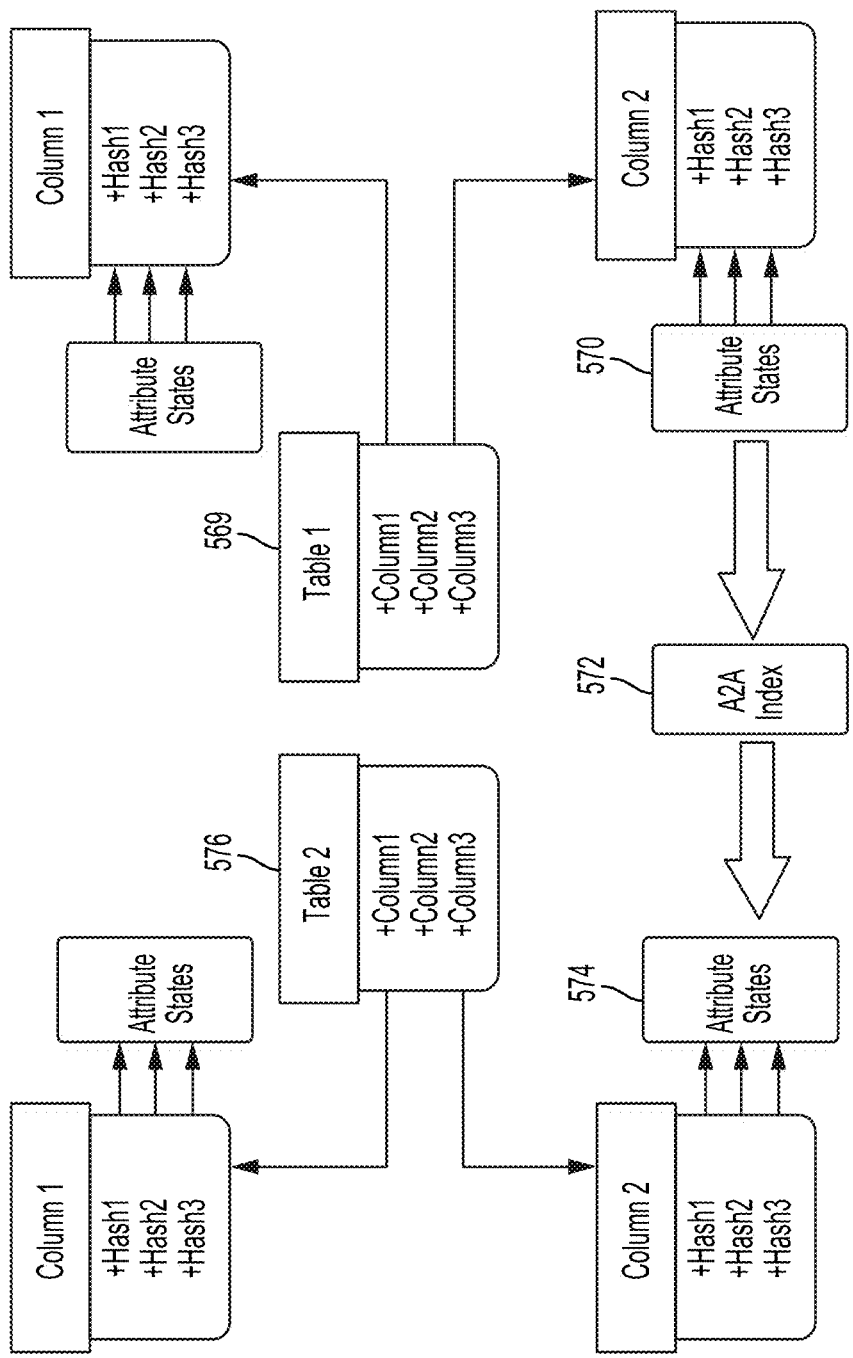
FIG. 5E illustrates an example of inter-table inferencing using indexlets.
Figure 5F:
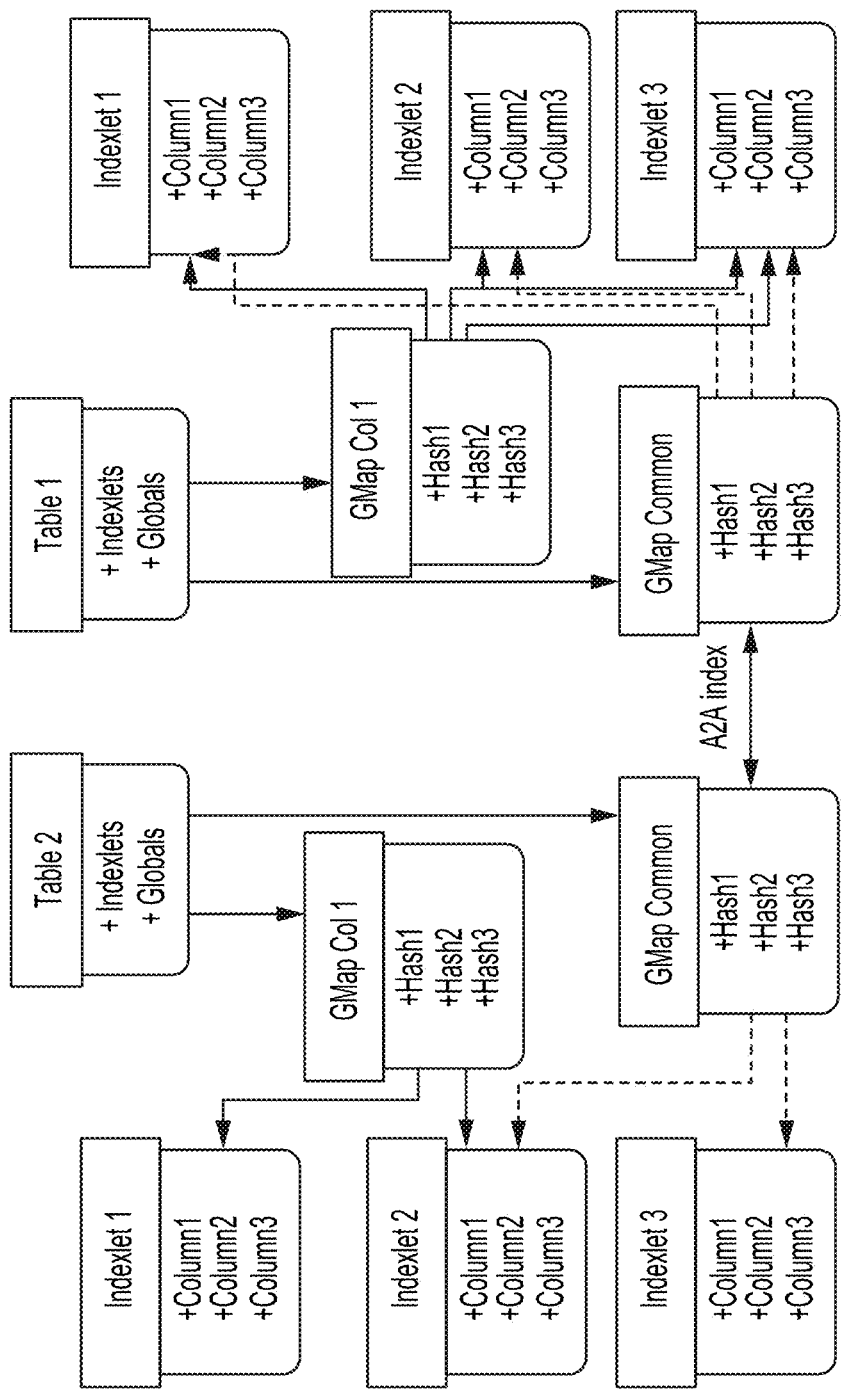
FIG. 5F illustrates an example of linking indexlets of different tables.

In an aspect, after performing intra-table inferencing, the logical inference engine 106 can perform inter-table inferencing based on the intra-table inferencing output of a plurality of tables, as is depicted in FIG. 5E. In an aspect, intra-table inferencing can include transferring a common field attribute of one table 569 to a child in its branch. In an aspect, this can be performed by running the attribute states 570 output from intra-table inferencing through an attribute-to-attribute (A2A) index 572 referencing the attribute states 574 in a second table 576. In an aspect, the A2A index 572 can be partitioned into one or more indexlets as described herein with respect to other data tables. In another aspect, transferring a common field attribute of one table 569 to a child in its branch by running the attribute states 570 output from intra-table inferencing through a function or logic performing similar functionality as the A2A index 572. For example, a function, service, or other logic can accept as input a pair of symbols and return an indication of whether or not they are related, e.g. TRUE or FALSE. In another aspect, attribute-to-attribute relations can be indicated by user input.

Based on current selections and possible rows in data tables a calculation/chart engine 108 can calculate aggregations in objects forming transient hypercubes in an application. The calculation/chart engine 108 can further build a virtual temporary table from which aggregations can be made. The calculation/chart engine 108 can perform a calculation (e.g., evaluate an expression in response to a user selection/de-selection) via a multithreaded operation. The state-space can be queried to gather all of the combinations of dimensions and values necessary to perform the calculation. In an aspect, the query can be on one thread per object, one process, one worker, combinations thereof, and the like. The expression can be calculated on multiple threads per object. Results of the calculation can be passed to a rendering engine 116 and/or optionally to an extension engine 110.

In an aspect, the chart engine 108 can receive dimensions, expressions, and sorting parameters and can compute a hypercube data structure containing aggregations along the dimensions. For example, a virtual record can be built with a placeholder for all field values (or indices) needed, as a latch memory location. When all values are assigned, the virtual record can be processed to aggregate the fields needed for computations and save the dimension values in a data structure per row of the resulting hypercube. In such a way, the traversal of the database can be done in an arbitrary way, just depending on requirements provided by memory consumption and indexing techniques used for the particular case at hand.

In an aspect, any aggregation function processed by the associative data indexing engine 100 can be qualified to operate on a subset of records (rather than a current selection of data records and/or all data records). The associative data indexing engine 100 can define alternative aggregation sets based on set analysis (e.g., set expression, etc.). Using set analysis, the associative data indexing engine 100 can support methods to define an aggregation set. The exact compositions of defined aggregation sets may not only depend on desired conditions but also the chart (analysis) they are used in. The associative data indexing engine 100 may execute/perform set analysis (e.g., set expression analysis, etc.) for one or more set expressions determined/extracted from a query, such as an undetermined query (e.g., an imprecise query, an undefined query, an incomplete query, a partially expressed query, a portioned query, etc.), to determine and/or define an aggregation set.

To define an aggregation set for an undetermined query (e.g., an imprecise query, an undefined query, an incomplete query, a partially expressed query, a portioned query, etc.), the associative data indexing engine 100 may consider and/or account for items (e.g., compositional elements, predicates, etc.), constraints (e.g., data constraints, logical constraints, etc.) of the query, and one or more data analysis models (e.g., data charts, data tables, data graphs, data maps, graphical objects, key performance indicators (KPIs), etc.).

For example, the associative data indexing engine 100 may determine how each input item and/or computational element fits a data analysis model based on the data analysis model's capacity and/or projectability of an item (e.g., whether it has any condition, whether the condition results on one or multiple values, etc.). For example, the associative data indexing engine 100 may determine an optimal data analysis model from one or more data analysis models determined (e.g., via the chart engine 108, etc.) from an undetermined query that best fits each input item and/or computational element.

For example, the associative data indexing engine 100 may define an aggregation set for each of the following undetermined business-related queries:

Query 1: Sales by product where sales>2000
Query 2: Products with sales>2000
Query 3: Number of products with sales>2000

Query 1, Query 2, and Query 3, each include similar (e.g., conceptually similar, etc.) items (e.g., compositional elements, predicates, etc.), such as "sales," "products," ">2000," and/or the like. The associative data indexing engine 100 may, for example, use natural language parsing and/or metadata analysis to determine the items and/or any constraints of the query, such as a default analysis period, a required data/element selection, and/or the like. The computing device may determine/perform a different set analysis for the Query 1, the Query 2, the Query 3, and/or any other undetermined query based on, for example, an order/arrangement of items (and/or computational elements/constraints) of the query and/or the composition (e.g., dimensions, measures, etc.) of one or more data analysis models (e.g., data charts, data tables, data graphs, data maps, graphical objects, key performance indicators (KPIs), etc.). The computing device may determine/perform a different set analysis for Query 1, Query 2, and Query 3 (and/or any other query) according to novel algorithms described herein.

Compositional elements (e.g., predicates, conditions, data constraints, etc.) of a query and/or query data may be determined. Compositional elements (e.g., predicates, conditions, data constraints, etc.) of the query data may include and/or be based on text/items from the query and corresponding conditional predicate(s). For example, for Query 1, Query 2, and Query 3, the associative data indexing engine 100 may determine example compositional elements shown below:

| Predicate   | Condition          |
|-------------|--------------------|
| Sales item  | >2000              |
| ProductName | N/A (no condition) |

Metadata for and/or associated with an undetermined query and/or any compositional element for the undetermined query may be determined. For example, semantic data types may uniformly represent standard data types, compositional elements, validations, formatting rules, and other business logic that may be further used to determine and/or define an aggregation set. Semantic types may be stored as metadata structures that may be used and reused during the process of query analysis.

For example, for Query 1, Query 2, and/or Query 3, the associative data indexing engine 100 may use undetermined query semantic types and/or the like to determine/define a default analysis specified for certain facts (e.g., including Sales, etc.) and/or certain facts may be preconditioned to making a selection on certain compositional elements and/or categories of the query. For example, for Query 1, Query 2, and/or Query 3, the associative data indexing engine 100 may determine and/or assume Sales (e.g., number of product sales, etc.) are expected to be constrained to a current quarter (and/or an extra condition such as QuartersAgo=0).

A set of input items and/or computational elements may be adjusted, for example by the associative data indexing engine 100, to ensure there is no conflict. A query, such as a natural question, may include an explicit time frame, for example, an undetermined query may be "Sales by product, where sales>2000 in 2019," where the year 2019 is the explicit time frame for the query. The associative data indexing engine 100 may determine that any default time period is unwarranted and/or if the global selections already satisfy any metadata-driven preconditions to use a measure.

The best data analysis model for a query may be determined. For example, the best data analysis model may be a data analysis model most relevant to a query—determined based on how aggregated related data may potentially fit and/or apply to elements, fields, constraints, components, and/or the like of a data analysis model. For example, input items and/or computational elements associated with a rank and/or ranking may be best fitted to a bar chart and/or related data analysis model, input items and/or computational elements associated with values may be best fitted to a table, input items and/or computational elements associated with facts may be best fitted to a KPI and/or related data analysis model.

The associative data indexing engine 100 may determine, for example, a data analysis model most relevant to a query based on the analysis' capacity and also the projectability of an item and/or compositional element and of a query, such as whether the item and/or compositional element is associated with any condition, and/or whether the condition results on one or multiple values. For example, the associative data indexing engine 100 may determine that a rank analysis may accommodate one measure and one dimension. For example, a rank analysis and/or associated data analysis model may be determined for Query 1 (Sales by product where sales>2000) because a rank analysis and/or associated data analysis model may include "sales and measure," and "product" as dimensions. However, for a slightly modified query such as:

Modified Query 1: Sales by product in Nordic countries where Sales>2000; there are two dimensions, "product" and "country," to choose from, and "product" has no condition which gives it an edge over "country." In such a situation, the associative data indexing engine 100 may combine items, compositional elements, and/or constraints and determine/generate set expressions. A final set of compositional elements and/or constraints may be combined, for example by the query analysis module 105, for further analysis, for example, by the chart engine 108.

For example, for an undetermined query, such as Query 1, Query 2, and/or Query 3, all of the combinations of dimensions and values necessary to perform the calculation may include any conditional element and/or constraint of the query. The conditional element and/or constraint of the query may be applied to each measure by injecting a set modifier into a corresponding aggregation function. For example, the measure for a rank analysis may be as follows:
=sum({<Set1, Set2>} Sales),
where:
Set1=[Product]={'=Sum({<[QuartersAgo]={0}>} Sales>2000)' }; and Set12=[QuartersAgo]={0}.

Notably, the aggregation of Sales is further modified by a set of products whose sales are greater than 2000 (hence the second inner self-aggregation). For an analysis with no Measure (e.g., only dimensions, etc.), essentially the same pattern may be used. However, constraints (and/or conditional elements) are applied to instances of the projecting dimension(s). For example, for Query 2 (Products with sales>2000), the expression for Product may be as follows:
=Aggr(if (sum({<QuartersAgo]={0}>} Sales)>2000 Only (Product)), Product).

Analysis with no dimension may require, for most cases, the measure expression to be adjusted by using other constraints (and/or conditional elements) as simple attribute constraints. For example, for an undetermined query such as "Sales where costs>1000," the condition on Cost may be applied at leaf level (no aggregation). A set expression may be as follows:
=Sum({<Cost={">1000"}>} Sales)

However, an exception may occur. The exception is when an explicit dimension, such as "Product" from Query 3 (Number of products with sales>2000), may be found. This happens only for aggregation of distinct-count. If so, the measure constraints may be properly aggregated and applied, for example, as follows:
=count(distinct{<Product={'=Sum({<({<[QuartersAgo] ={0}>} Sales)>2000'}, ({<[QuartersAgo]={0}>} Product).

Figure 3:
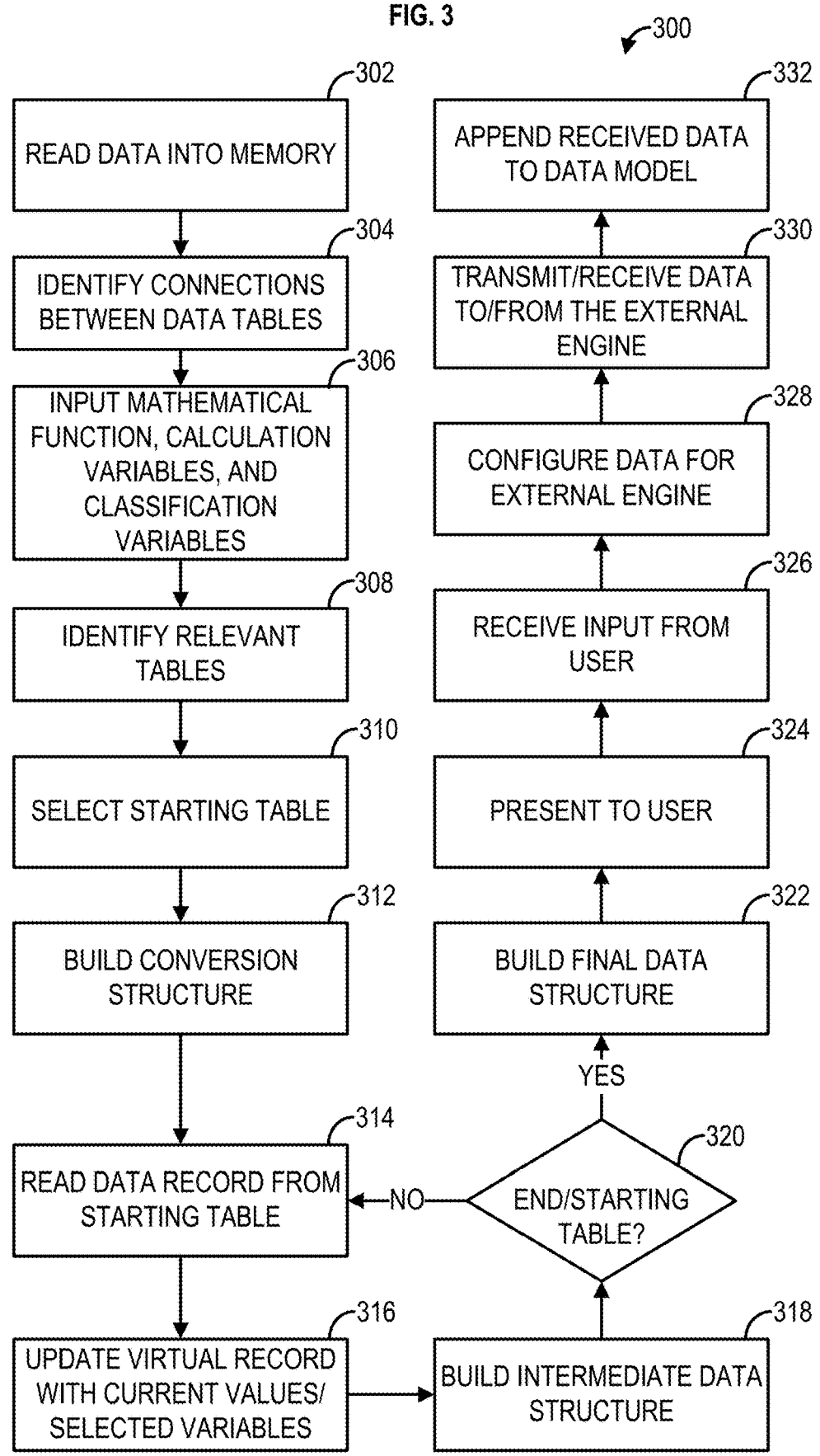
FIG. 3 is a schematic flowchart showing basic steps performed when extracting information from a database.

The methods provided can be implemented by means of a computer program as illustrated in a flowchart of a method 300 in FIG. 3. In a step 302, the program can read some or all data records in the database, for instance using a SELECT statement which selects all the tables of the database, e.g. Tables 1-5. In an aspect, the database can be read into primary memory of a computer.

To increase evaluation speed, each unique value of each data variable in said database can be assigned a different binary code and the data records can be stored in binary-coded form. This can be performed, for example, when the program first reads the data records from the database. For each input table, the following steps can be carried out. The column names, e.g. the variables, of the table can be read (e.g., successively). Every time a new data variable appears, a data structure can be instantiated for the new data variable. An internal table structure can be instantiated to contain some or all the data records in binary form, whereupon the data records can be read (e.g., successively) and binary-coded. For each data value, the data structure of the corresponding data variable can be checked to establish if the value has previously been assigned a binary code. If so, that binary code can be inserted in the proper place in the above-mentioned table structure. If not, the data value can be added to the data structure and assigned a new binary code, for example the next binary code in ascending order, before being inserted in the table structure. In other words, for each data variable, a unique binary code can be assigned to each unique data value.

After having read some or all data records in the database, the method 300 can analyze the database in a step 304 to identify all connections between the data tables. A connection between two data tables means that these data tables have one variable in common. In an aspect, step 304 can comprise generation of one or more bidirectional table indexes and one or more bidirectional associative indexes. In an aspect, generation of one or more bidirectional table indexes and one or more bidirectional associative indexes can comprise a separate step. In another aspect, generation of one or more bidirectional table indexes and one or more bidirectional associative indexes can be on-demand. After the analysis, all data tables are virtually connected. In FIG. 2, such virtual connections are illustrated by double-ended arrows. The virtually connected data tables can form at least one so-called "snowflake structure," a branching data structure in which there is one and only one connecting path between any two data tables in the database. Thus, a snowflake structure does not contain any loops. If loops do occur among the virtually connected data tables, e.g. if two tables have more than one variable in common, a snowflake structure can in some cases still be formed by means of special algorithms known in the art for resolving such loops.

After this initial analysis, the user can explore the database and/or define a mathematical function. Assume that the user wants to extract the total sales per year and client from the database in FIG. 2. The user defines a corresponding mathematical function "SUM (x*y)", and selects the calculation variables to be included in this function: "Price" and "Number." The user also selects the classification variables: "Client" and "Year."

Optionally, a mathematical function may be determined for an undetermined query (e.g., an imprecise query, an undefined query, an incomplete query, a partially expressed query, a portioned query, etc.), for example, "Sales by product where sales>2000." Calculation variables for the undetermined query may include "Product," "Price," "Date," and "Year."

At step 306, a mathematical function may be determined. The mathematical function may be, for example, a combination of mathematical expressions. For example, an undetermined query such as "Sales by product where sales>2000," can be used to extract the total sales of a product where the number (e.g., sale amount, etc.) exceeds 2000. A corresponding mathematical function may be defined, for example by a user as:
=sum({<Set1, Set2>} Sales),
where:
Set1=[Product]={'=Sum({<[QuartersAgo]={0}>} Sales>2000)'}; and Set12=[QuartersAgo]={0}.

Calculation variables to be included in this function may include "Product" and "Number." The classification variable "Year" may also be set, for example, by a user.

The method 300 then identifies in step 308 all relevant data tables, e.g. all data tables containing any one of the selected calculation and classification variables, such data tables being denoted boundary tables, as well as intermediate data tables in the connecting path(s) between these boundary tables in the snowflake structure, such data tables being denoted connecting tables. There are no connecting tables in the present example. In an aspect, one or more bidirectional table indexes and one or more bidirectional associative indexes can be accessed as part of step 308.

In the present example, all occurrences of every value, e.g. frequency data, of the selected calculation variables can be included for evaluation of the mathematical function. In FIG. 2, the selected variables ("Price," "Number") can require such frequency data. Now, a subset (B) can be defined that includes all boundary tables (Tables 1-2) containing such calculation variables and any connecting tables between such boundary tables in the snowflake structure. It should be noted that the frequency requirement of a particular variable is determined by the mathematical expression in which it is included. Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table can be selected in step 310, for example, among the data tables within subset (B). In an aspect, the starting table can be the data table with the largest number of data records in this subset. In FIG. 2, Table 2 can be selected as the starting table. Thus, the starting table contains selected variables ("Client," "Number"), and connecting variables ("Date," "Product"). These connecting variables link the starting table (Table 2) to the boundary tables (Tables 1 and 3).

Thereafter, a conversion structure can be built in step 312. This conversion structure can be used for translating each value of each connecting variable ("Date," "Product") in the starting table (Table 2) into a value of a corresponding selected variable ("Year," "Price") in the boundary tables (Table 3 and 1, respectively). A table of the conversion structure can be built by successively reading data records of Table 3 and creating a link between each unique value of the connecting variable ("Date") and a corresponding value of the selected variable ("Year"). It can be noted that there is no link from value 4 ("Date: 1999 Jan. 12"), since this value is not included in the boundary table. Similarly, a further table of the conversion structure can be built by successively reading data records of Table 1 and creating a link between each unique value of the connecting variable ("Product") and a corresponding value of the selected variable ("Price"). In this example, value 2 ("Product: Toothpaste") is linked to two values of the selected variable ("Price: 6.5"), since this connection occurs twice in the boundary table. Thus, frequency data can be included in the conversion structure. Also note that there is no link from value 3 ("Product: Shampoo").

When the conversion structure has been built, a virtual data record can be created. Such a virtual data record accommodates all selected variables ("Client," "Year," "Price," "Number") in the database. In building the virtual data record, a data record is read in step 314 from the starting table (Table 2). Then, the value of each selected variable ("Client", "Number") in the current data record of the starting table can be incorporated in the virtual data record in a step 316. Also, by using the conversion structure each value of each connecting variable ("Date", "Product") in the current data record of the starting table can be converted into a value of a corresponding selected variable ("Year", "Price"), this value also being incorporated in the virtual data record.

In step 318 the virtual data record can be used to build an intermediate data structure. Each data record of the intermediate data structure can accommodate each selected classification variable (dimension) and an aggregation field for each mathematical expression implied by the mathematical function. The intermediate data structure can be built based on the values of the selected variables in the virtual data record. Thus, each mathematical expression can be evaluated based on one or more values of one or more relevant calculation variables in the virtual data record, and the result can be aggregated in the appropriate aggregation field based on the combination of current values of the classification variables ("Client," "Year").

The above procedure can be repeated for one or more additional (e.g., all) data records of the starting table. In a step 320 it can be checked whether the end of the starting table has been reached. If not, the process can be repeated from step 314 and further data records can be read from the starting table. Thus, an intermediate data structure can be built by successively reading data records of the starting table, by incorporating the current values of the selected variables in a virtual data record, and by evaluating each mathematical expression based on the content of the virtual data record. If the current combination of values of classification variables in the virtual data record is new, a new data record can be created in the intermediate data structure to hold the result of the evaluation. Otherwise, the appropriate data record is rapidly found, and the result of the evaluation is aggregated in the aggregation field.

Thus, data records can be added to the intermediate data structure as the starting table is traversed. The intermediate data structure can be a data table associated with an efficient index system, such as an AVL or a hash structure. The aggregation field can be implemented as a summation register, in which the result of the evaluated mathematical expression is accumulated.

In some aspects, e.g. when evaluating a median, the aggregation field can be implemented to hold all individual results for a unique combination of values of the specified classification variables. It should be noted that only one virtual data record is needed in the procedure of building the intermediate data structure from the starting table. Thus, the content of the virtual data record can be updated for each data record of the starting table. This can minimize the memory requirement in executing the computer program.

After traversing the starting table, the intermediate data structure can contain a plurality of data records. If the intermediate data structure accommodates more than two classification variables, the intermediate data structure can, for each eliminated classification variable, contain the evaluated results aggregated over all values of this classification variable for each unique combination of values of remaining classification variables.

In an aspect, step 322 can involve any of the processes described previously with regard to FIG. 5A-5F as part of a process for creating the hypercube/multidimensional cube. For example, output from the logical inference engine 18 and/or 106 utilizing one or more BTIs and or one or more A2A indexes can be used in creation of the hypercube/ multidimensional cube. When a user makes a selection, the inference engine 18 and/or 106 calculates a data subset of which one or more BTIs and/or A2A indexes can be generated and provided to the chart engine 58 and/or 108 for use in generating a hypercube/multidimensional cube and/or evaluating one or more expressions against a hypercube/multidimensional cube via one or more BTIs and/or A2A indexes as described with regard to FIG. 5A-5F.

In an aspect, when the intermediate data structure has been built, a final data structure(s), e.g., data analysis model(s) (e.g., data charts, data tables, data graphs, data maps, key performance indicators (KPIs), etc.), may be created by evaluating the mathematical function based on the results of the mathematical expression contained in the intermediate data structure. In doing so, the results in the aggregation fields for each unique combination of values of the classification variables may be combined.

The data analysis model may be a best fit data analysis model, for example, a data analysis model that best fits compositional elements (e.g., predicates, conditions, data constraints, etc.) of an undetermined query and/or any other query. As explained, a data analysis model most relevant to a query may be based on the analysis' capacity and also the projectability of an item and/or compositional element and of the query, such as whether the item and/or compositional element is associated with any condition, and/or whether the condition results on one or multiple values.

In the example, the creation of the final data structure is straightforward, due to the trivial nature of the present mathematical function. At step 324, the content of the final data structure may be presented to the user, for example, in a corresponding data analysis model, as shown in FIGS. 5G-5I.

Figures 5G, 5H, 5I:
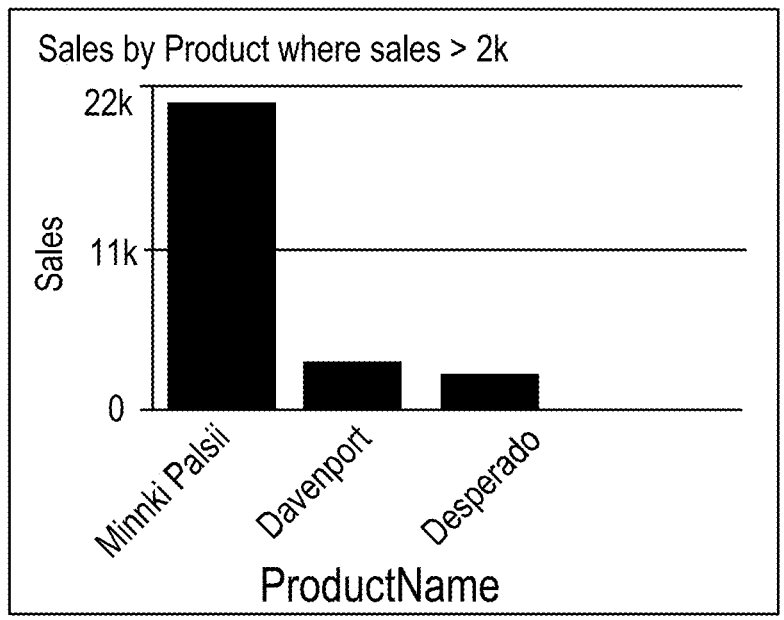
FIGS. 5G-I illustrate example data analysis models.

FIG. 5G is a best fit data analysis model corresponding to Query 1 (Sales by product where sales>2000). FIG. 5G shows that a bar chart is an optimal data analysis model for Query 1 based on the compositional elements of the query. FIG. 5H is a best fit data analysis model corresponding to Query 2 (Products with sales>2000). FIG. 5H shows that a data table is an optimal data analysis model for Query 2 based on the compositional elements of the query. FIG. 5I is a best fit data analysis model corresponding to Query 3 (Number of products with sales>2000). FIG. 5I shows that a key performance indicator (KPI) is an optimal data analysis model for Query 3 based on the compositional elements of the query.

At step 326, input from the user can be received. For example, input from the user can be a selection and/or de-selection of the presented results.

Optionally, input from the user at step 326 can comprise a request for external processing. In an aspect, the user can be presented with an option to select one or more external engines to use for the external processing. Optionally, at step 328, data underlying the user selection can be configured (e.g., formatted) for use by an external engine. Optionally, at step 330, the data can be transmitted to the external engine for processing and the processed data can be received. The received data can undergo one or more checks to confirm that the received data is in a form that can be appended to the data model. For example, one or more of an integrity check, a format check, a cardinality check, combinations thereof, and the like. Optionally, at step 332, processed data can be received from the external engine and can be appended to the data model as described herein. In an aspect, the received data can have a lifespan that controls how long the received data persists with the data model. For example, the received data can be incorporated into the data model in a manner that enables a user to retrieve the received data at another time/session. In another example, the received data can persist only for the current session, making the received data unavailable in a future session.

FIG. 5A shows how an undetermined query 50 (e.g., an imprecise query, an undefined query, an incomplete query, a partially expressed query, a portioned query, etc.) operates and/or is executed on a data/information 52 to generate a data subset 54. The data subset 54 can form a state space, which is based on the undetermined query 50. In an aspect, the state space (or "user state") may be defined by a user providing query information via a user interface of an application. For example, the state space may be based on any of the following undetermined business-related queries:

Query 1: Sales by product where sales>2000
Query 2: Products with sales>2000
Query 3: Number of products with sales>2000

Query 1, Query 2, and Query 3, each include similar (e.g., conceptually similar, etc.) items (e.g., compositional elements, predicates, etc.), such as "sales," "products," ">2000," and/or the like. Natural language parsing and/or metadata analysis may be used to determine the items and/or any constraints of the query, such as a default analysis period, a required data/element selection, and/or the like. A different set analysis may be performed for Query 1, Query 2, Query 3, and/or any other undetermined query based on, for example, an order/arrangement of items (and/or constraints) of the query and/or the composition (e.g., dimensions, measures, etc.) of one or more data analysis models (e.g., data charts, data tables, data graphs, data maps, graphical objects, key performance indicators (KPIs), etc.).

One or more items and/or data constraints of an undetermined query may be used to determine one or more data analysis models. An application can be designed to host a number of data analysis models (e.g., data charts, data tables, data graphs, data maps, graphical objects, key performance indicators (KPIs), etc.) that evaluate one or more mathematical functions (also referred to as an "expression") on the data subset 54 for one or more dimensions (classification variables). The result of this evaluation creates a data analysis model result 56.

As illustrated in FIG. 5A, when a user selection, such as an undetermined query 50, is received, the inference engine 18 calculates a data subset. Also, an identifier ID1 for the selection together with the scope can be generated based on the filters in the selection and the scope. Subsequently, an identifier ID2 for the data subset is generated based on the data subset definition, for example, a bit sequence that defines the content of the data subset. ID2 can be put into a cache using ID1 as a lookup identifier. Likewise, the data subset definition can be put in the cache using ID2 as a lookup identifier.

As shown in FIG. 5A, a chart (and/or any other data analysis model) calculation in a calculation/chart engine 58 takes place in a similar way. Here, there are two information sets: the data subset 54 and relevant chart (and/or any other data analysis model) properties 60. The latter can be, but not restricted to, a mathematical function together with calculation variables and classification variables (dimensions). For example, for an undetermined query (e.g., Query 1, Query 2, Query 3, etc.) combinations of dimensions and values necessary to perform a calculation may include any conditional element and/or constraint of the query. The conditional element and/or constraint of the query may be applied to each measure by injecting a set modifier into a corresponding aggregation function. For example, the measure for a rank analysis may be as follows:

=sum({<Set1, Set2>} Sales),
where:
Set1=[Product]={'=Sum({<[QuartersAgo]={0}>} Sales>2000)' }; and Set12=[QuartersAgo]={0}.

Notably, the aggregation of Sales is further modified by a set of products whose sales are greater than 2000 (hence the second inner self-aggregation). For an analysis with no Measure (e.g., only dimensions, etc.), essentially the same pattern may be used. However, constraints (and/or conditional elements) are applied to instances of the projecting dimension(s). For example, for Query 2 (Products with sales>2000), the expression for Product may be as follows:
=Aggr(if (sum({<QuartersAgo]={0}>} Sales)>2000 Only (Product)), Product).

Analysis with no dimension may require, for most cases, the measure expression to be adjusted by using other constraints (and/or conditional elements) as simple attribute constraints. For example, for an undetermined query such as "Sales where costs>1000," the condition on Cost may be applied at leaf level (no aggregation). A set expression may be as follows:
=Sum({<Cost={">1000"}>} Sales)

However, an exception may occur. The exception is when an explicit dimension, such as "Product" from Query 3 (Number of products with sales>2000), may be found. This happens only for aggregation of distinct-count. If so, the measure constraints may be properly aggregated and applied, for example, as follows:
=count(distinct{<Product={'=Sum({<({<[QuartersAgo]={0}>} Sales)>2000'}, ({<[QuartersAgo]={0}>} Product).

Mathematical functions together with calculation variables and classification variables (dimensions) can be used to calculate the chart result 56, and both of these information sets can be also used to generate identifier ID3 for the input to the chart calculation. ID2 can be generated already in the previous step, and ID3 can be generated as the first step in the chart calculation procedure.

The identifier ID3 can be formed from ID2 and the relevant chart properties. ID3 can be seen as an identifier for a specific chart generation instance, which can include all information needed to calculate a specific chart result. In addition, a chart result identifier ID4 can be created from the chart result definition, for example, a bit sequence that defines the chart result 56. ID4 can be put in the cache using ID3 as a lookup identifier. Likewise, the chart result definition can be put in the cache using ID4 as a lookup identifier.

Optionally, further calculations, transforming, and/or processing can be included through an extension engine 62. Optionally, associated results from the inference engine 18 and further computed by hypercube computation in said calculation/chart engine 58 can be coupled to an external engine 64 that can comprise one or more data processing applications (e.g., simulation applications, statistical applications, mathematical computation applications, database applications, combinations thereof, and the like). Context of a data model processed by the inference engine 18 can comprise a tuple or tuples of values defined by dimensions and expressions computed by hypercube routines. Data can be exchanged through an interface 66.

The associated results coupled to the external engine 64 can be intermediate. Further results that can be final hypercube results can also be received from the external engine 64. Further results can be fed back to be included in the Data/Scope 52 and enrich the data model. The further results can also be rendered directly to the user in the chart result 56. Data received from and computed by the external engine 64 can be used for further associative discovery.

Each of the data elements of the database shown in Tables 1-5 of FIG. 2 has a data element type and a data element value (for example "Client" is the data element type and "Nisse" is the data element value). Multiple records can be stored in different database structures such as data cubes, data arrays, data strings, flat files, lists, vectors, and the like; and the number of database structures can be greater than or equal to one and can comprise multiple types and combinations of database structures. While these and other database structures can be used with, and as part of, the methods and systems disclosed, the remaining description will refer to tables, vectors, strings, and data cubes solely for convenience.

Additional database structures can be included within the database illustrated as an example herein, with such structures including additional information pertinent to the database such as, in the case of products for example; color, optional packages, etc. Each table can comprise a header row which can identify the various data element types, often referred to as the dimensions or the fields, that are included within the table. Each table can also have one or more additional rows which comprise the various records making up the table. Each of the rows can contain data element values (including null) for the various data element types comprising the record.

The database as referred to in Tables 1-5 of FIG. 2 can be queried by specifying the data element types and data element values of interest and by further specifying any functions to apply to the data contained within the specified data element types of the database. The functions which can be used within a query can include, for example, expressions using statistics, sub-queries, filters, mathematical formulas, and the like, to help the user to locate and/or calculate the specific information wanted from the database. Once located and/or calculated, the results of a query can be displayed to the user with various visualization techniques and objects such as list boxes of a user interface illustrated in FIG. 6.

The graphical objects (or visual representations) can be substantially any display or output type including graphs, charts, trees, multi-dimensional depictions, images (computer-generated or digital captures), video/audio displays describing the data, hybrid presentations where output is segmented into multiple display areas having different data analysis in each area and so forth. A user can select one or more default visual representations; however, a subsequent visual representation can be generated on the basis of further analysis and subsequent dynamic selection of the most suitable form for the data.

In an aspect, a user can select a data point and a visualization component can instantaneously filter and re-aggregate other fields and corresponding visual representations based on the user's selection. In an aspect, the filtering and re-aggregation can be completed without querying a database. In an aspect, a visual representation can be presented to a user with color schemes applied meaningfully. For example, a user selection can be highlighted in green, datasets related to the selection can be highlighted in white, and unrelated data can be highlighted in gray. A meaningful application of a color scheme provides an intuitive navigation interface in the state space.

The result of a standard query can be a smaller subset of the data within the database, or a result set, which is comprised of the records, and more specifically, the data element types and data element values within those records, along with any calculated functions, that match the specified query. For example, as indicated in FIG. 6, the data element value "Nisse" can be specified as a query or filtering criteria as indicated by a frame in the "Client" header row. In some aspects, the selected element can be highlighted in green. By specifically selecting "Nisse," other data element values in this row are excluded as shown by gray areas. Further, "Year" "1999" and "Month" "January" are selected in a similar way.

Optionally, in this application, external processing can also be requested by ticking "External" in the user interface of FIG. 6. Data as shown in FIG. 7 can be exchanged with an External engine 64 through the interface 66 of FIG. 5A. In addition to evaluating the mathematical function ("SUM (Price*Number)") based on the results of the mathematical expression ("Price*Number") contained in the intermediate data structure the mathematical function ("SUM (ExtFunc (Price*Number))") can be evaluated. Data sent out are (Nisse, 1999, January, {19.5, null}). In this case the external engine 64 can process data in accordance with the formula

```
if (x==null)
    y=0.5
else
    y=x
``` as shown in in FIG. 7. The result input through the interface 66 will be (19.5, 0.5) as reflected in the graphical presentation in FIG. 6.

In a further aspect, external processing can also be optionally requested by ticking "External" in a box as shown in FIG. 8. Data as shown in FIG. 9 can be exchanged with an external engine 64 through the Interface 66 of FIG. 5A. In addition to evaluating the mathematical function ("SUM (Price*Number)") based on the results of the mathematical expression ("Price*Number") contained in the intermediate data structure the mathematical function:

SUM (ExtFunc(Price*Number))

can be evaluated. Data sent out are (Nisse, 1999, January, {19.5, null}). In this case, the external engine 64 will process data in accordance with Function (1) as shown below and in FIG. 9. The result input through the Interface 66 will be (61.5) as reflected in the graphical presentation in FIG. 8.

```
y=ExtAggr(x[ ])
for (x in x[ ])
    if (x==null)
        y=y + 42
    else
        y=y+x
Function (1)
```

Figure 13:
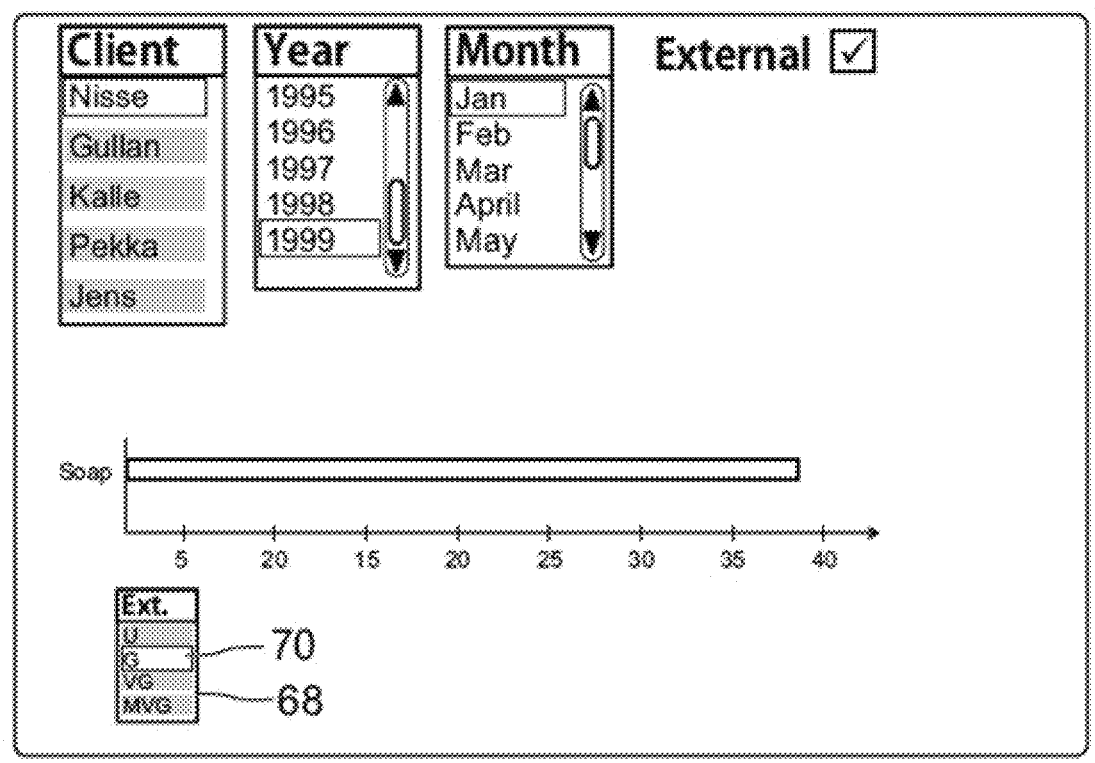
FIG. 13 is a schematic graphical presentation showing a further set of selections and a diagram of data associated to the selections as received after third computations from an external engine.

A further optional embodiment is shown in FIG. 10 and FIG. 11. The same basic data as in previous examples apply. A user selects "Pekka," "1999," "January," and "External." By selecting "External," already determined and associated results are coupled to the external engine 64. Feedback data from the external engine 64 based on an external computation, ExtQualification(Sum(Price*Number)), as shown in FIG. 13 will be the information "MVG." This information can be fed back to the logical inference engine 18. The information can also be fed back to the graphical objects of FIG. 10 and as a result a qualification table 68 will highlight "MVG" (illustrated with a frame in FIG. 10). Other values (U, G, and VG) are shown in gray areas. The result input through the Interface 66 will be Soap with a value of 75 as reflected in the graphical presentation (bar chart) of FIG. 10. FIG. 11 is a schematic representation of data exchanged with an external engine based on selections in FIG. 10. FIG. 12 is a table showing results from computations based on different selections in the presentation of FIG. 10.

Should a user instead select "Gullan," "1999," "January," and "External," the feedback signal would include "VG" based on the content shown in qualification table 68. The computations actually performed in the external engine 62 are not shown or indicated, since they are not relevant to the inference engine.

In FIG. 13 a user has selected "G" as depicted by 70 in the qualification table 68. As a result information fed back from the external engine 64 to the external engine 62 and further to the inference engine 18 the following information will be highlighted: "Nisse," "1999," and "January" as shown in FIG. 13. Furthermore, the result produced will be Soap 37.5 as reflected in the graphical presentation (bar chart) of FIG. 13.

A result of the various methods and systems disclosed herein is a business analytic solution. The business analytic solution operates on the data stored and/or generated (e.g., hypercube/multidimensional cube, various indexes, etc. . . . ) by the disclosed methods and systems. Users of the business analytic solution can query the data to obtain insight into the data. The query can be made, for example, by specifying data element types and data element values of interest and by further specifying any functions to apply to the data contained within the specified data element types of the database. The functions which can be used within a query can include, for example, expressions using statistics, sub-queries, filters, mathematical formulas, and the like, to help a user to locate and/or calculate the specific information wanted from the database. Once located and/or calculated, the results of a query can be displayed to the user with various visualization techniques and objects such as list boxes or various charts of a user interface. In another aspect, a result of the query can be displayed not only as visualizations but in the form of natural language, providing the user an insight overview across data sources and/or data tables.

Provided herein is a "smart" business analytic solution. For example, the business analytic solution can make reasonable defaults at various steps of an analysis, from data preparation, to building the data model, and preparing visual and/or text analyses. In an aspect, the business analytic solution can guide users to make sensible choices in order to quickly get to both expected answers and new answers (e.g., new insights). The business analytic solution enables a user to find unknown insights from the data and presents it to the user with the use of the precedent-based system disclosed.

Domain experts, such as data architects, or visualization experts, are sources to provide rules (e.g., defaults and guidelines, usually in the form of generic best practices) for data analysis. Similarly, specific precedents that are established by users or a community of users who actually use the data are also sources of rules (e.g., defaults and guidelines) for data analysis. The disclosed methods and systems present an optimized technique to capture and represent such rules. Given the heuristic nature of such rules, the disclosed methods and systems can utilize precedents to capture both types of rules (e.g., domain expert rules and user rules). Such precedents can then be utilized in a system that, given a specific context, can locate applicable precedents (for example, by similarity and/or generalization) and use those precedents to enable smart data analysis behavior.

Figure 14:
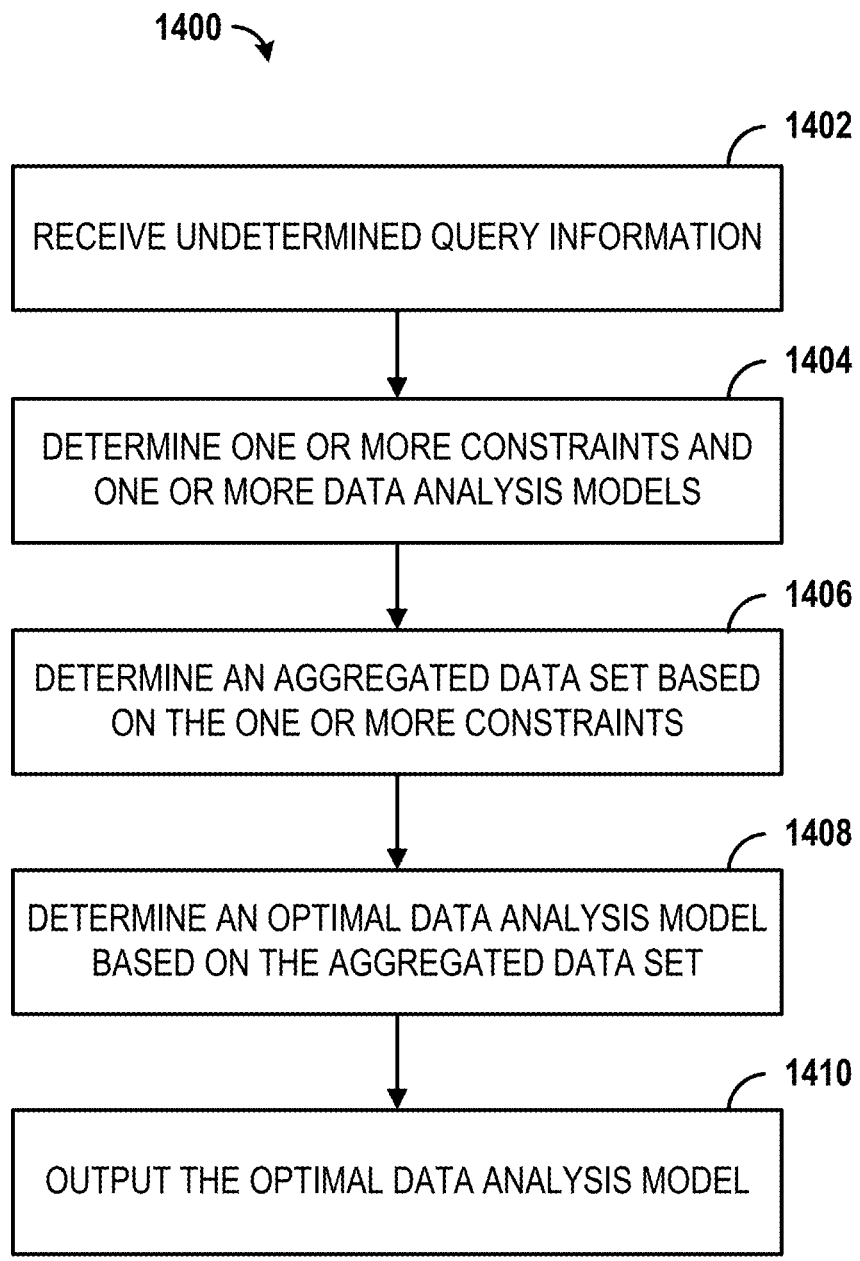
FIG. 14 is a flow chart illustrating an example method.

FIG. 14 provided is a method 1400 for undetermined query analytics. At step 1402, undetermined query information (e.g., an imprecise query, an undefined query, an incomplete query, a partially expressed query, a portioned query, etc.) may be received. For example, a computing device (e.g., a computer, a cloud-based device, a server, a smart device, etc.) may receive the query information via a user interface and/or from a user device (e.g., a client device, a smart device, a computing device, a network device, etc.). For example, the computing device may receive query information such as each of the following undetermined business-related queries:

Query 1: Sales by product where sales>2000
Query 2: Products with sales>2000
Query 3: Number of products with sales>2000.

At step 1404, one or more data constraints and one or more data analysis models may be determined based on the undetermined query information. The one or more data constraints may include one or more temporal data constraints, logical data constraints, and data-type constraints. determining the one or more data constraints may include mapping one or more textual elements of the undetermined query information to the one or more data constraints. The one or more data models may include one or more of: a data chart, a data table, a data graph, a data map, and/or key performance indicators (KPIs).

For example, Query 1, Query 2, and Query 3, each include similar (e.g., conceptually similar, etc.) items (e.g., compositional elements, predicates, etc.), such as "sales," "products," ">2000," and/or the like. The computing device may, for example, use natural language parsing and/or metadata analysis to determine the items and/or any constraints of the query, such as a default analysis period, a required data/element selection, and/or the like.

The one or more data analysis models may be determined based on the composition (e.g., dimensions, measures, etc.) of the one or more data analysis models. For example, how each input item and/or data constraint of a undetermined query fits a data analysis model based on the data analysis model's capacity and/or projectability of an item (e.g., whether it has any condition, whether the condition results on one or multiple values, etc.) may be used to determine the one or more data analysis models. For example, input items and/or data constraints associated with a rank and/or ranking may be best fitted to a bar chart and/or related data analysis model, input items and/or data constraints associated with values may be best fitted to a table, input items and/or computational elements associated with facts may be best fitted to a KPI and/or related data analysis model.

At step 1406, an aggregated data set may be determined. An aggregated data set may be determined based on the one or more data constraints. Determining the aggregated dataset may include applying the one or more constraints to an aggregation function. For example, The computing device may determine/perform a different set analysis (e.g., execution of an aggregation function, etc.) for Query 1, Query 2, Query 3, and/or any other undetermined query based on, for example, an order/arrangement of items (and/or constraints) of the query.

For example, for Query 1, Query 2, and/or Query 3, all of the combinations of dimensions and values necessary to perform the calculation may include any constraint (and/or conditional element) of the query. The constraint (and/or conditional element) of the query may be applied to each measure by injecting a set modifier into a corresponding aggregation function. For example, the measure for a rank analysis may be as follows:

=sum({<Set1, Set2>} Sales),
where:
Set1=[Product]={'=Sum({<[QuartersAgo]={0}>} Sales>2000)'}; and Set12=[QuartersAgo]={0}.

The aggregation of Sales is further modified by a set of products whose sales are greater than 2000 (hence the second inner self-aggregation). For an analysis with no Measure (e.g., only dimensions, etc.), essentially the same pattern may be used. However, constraints (and/or conditional elements) are applied to instances of the projecting dimension(s). For example, for Query 2 (Products with sales>2000), the expression for Product may be as follows:
=Aggr(if (sum({<QuartersAgo]={0}>} Sales)>2000 Only (Product)), Product).

Analysis with no dimension may require, for most cases, the measure expression to be adjusted by using other constraints (and/or conditional elements) as simple attribute constraints. For example, for an undetermined query such as "Sales where costs>1000," the condition on Cost may be applied at leaf level (no aggregation). A set expression may be as follows:
=Sum({<Cost={">1000"}>} Sales)

However, an exception may occur. The exception is when an explicit dimension, such as "Product" from Query 3 (Number of products with sales>2000), may be found. This happens only for aggregation of distinct-count. If so, the measure constraints may be properly aggregated and applied, for example, as follows:
=count(distinct{<Product={'=Sum({<({<[QuartersAgo]={0}>} Sales)>2000'}, ({<[QuartersAgo]={0}>} Product).

At step 1408, an optimal data analysis model may be determined. The optimal data analysis model may be determined based on the aggregated dataset produced by an aggregation function and the one or more data analysis models. For example, the computing device may determine an optimal data analysis model from one or more data analysis models determined from an undetermined query that best fits each input item and/or constraint of the query. For example, determining the optimal data analysis model may include determining, for each of the one or more data analysis models, an amount of correspondence between a plurality of portions of data of the aggregated dataset and a plurality of elements of the data analysis model, determining, based on the amount of correspondence between the plurality of portions of data of the aggregated dataset and the plurality of elements of each the one or more data analysis models, a data analysis model of the one or more data analysis models associated with a highest amount of correspondence, and determining that the data analysis model associated with the highest amount of correspondence is the optimal data analysis model.

The method 1400 may further include determining that the optimal data analysis model includes elements of the plurality of elements that do not correspond to one or more portions of the plurality of portions of data of the aggregated dataset, and determining, based on the one or more data constraints, another aggregated dataset. The another aggregated dataset may include one or more portions of data that correspond to one or more elements of the plurality of elements of the optimal data analysis model. The aggregated dataset may be based on data from a source and the another aggregated dataset may be based on data from a different source. For example, the source associated with the aggregated dataset may include an in-memory data store, and the different source may include a public domain (e.g. Internet, a universal application, etc.). Determining the another aggregated dataset may include applying the one or more constraints to the aggregation function.

At step 1410, the optimal data analysis model may be output. The computing device may cause the output of the optimal data analysis model. For example, the optimal data analysis model may be displayed via a user interface and/or the like. The optimal data analysis model may indicate at least a portion of the aggregated dataset. For example, the optimal data analysis model may include data determined based on the aggregating function.

Figure 15:
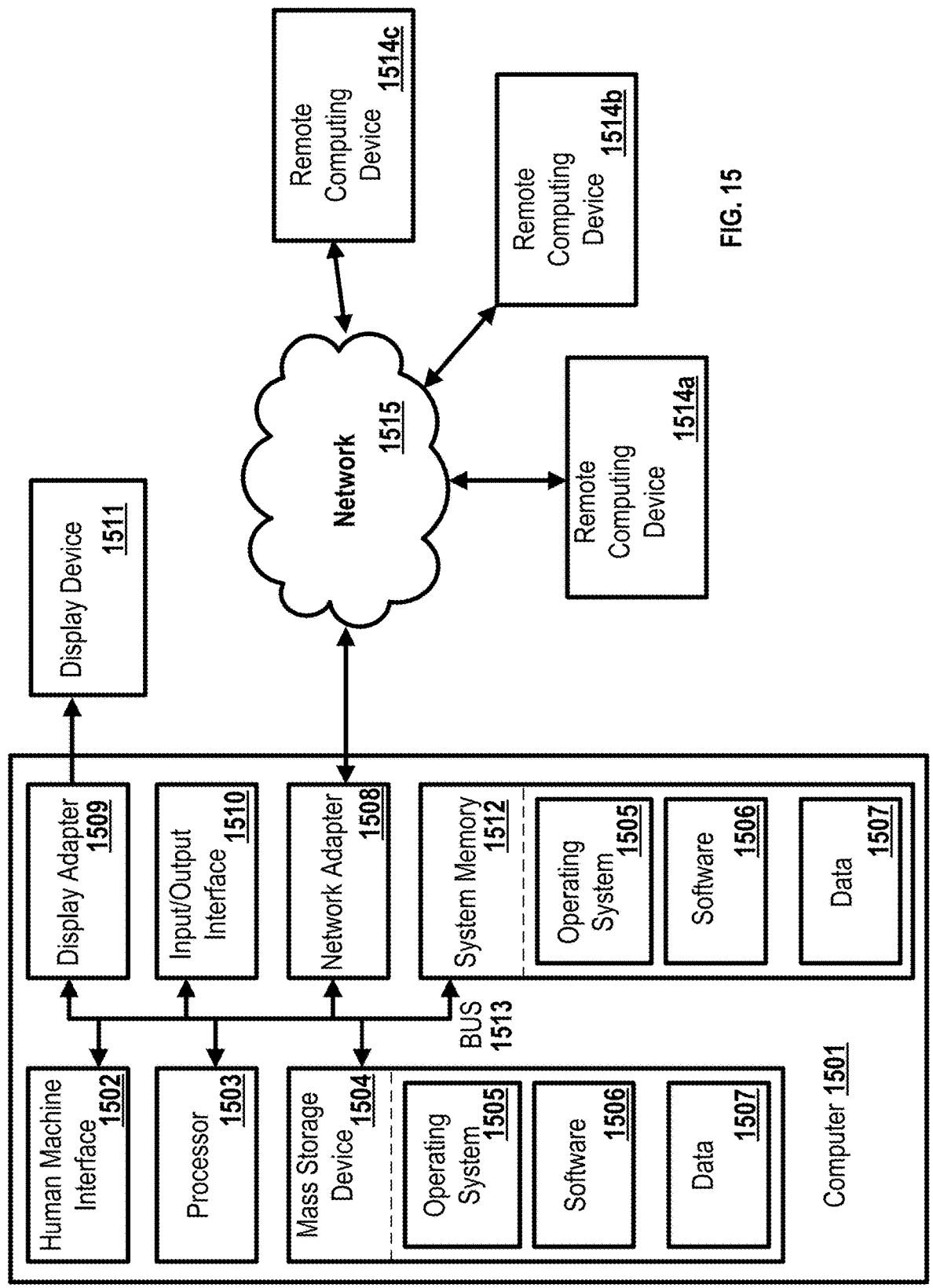
FIG. 15 is an exemplary operating environment for performing the disclosed methods.

In an exemplary aspect, the methods and systems can be implemented on a computer 1501 as illustrated in FIG. 15 and described below. Similarly, the methods and systems disclosed can utilize one or more computers to perform one or more functions in one or more locations. FIG. 15 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1501. The components of the computer 1501 can comprise, but are not limited to, one or more processors 1503, a system memory 1512, and a system bus 1513 that couples various system components including the one or more processors 1503 to the system memory 1512. The system can utilize parallel computing.

The system bus 1513 represents one or more of several possible types of bus structures, including a memory bus or memory controller, a peripheral bus, an accelerated graphics port, or local bus using any of a variety of bus architectures. The bus 1513, and all buses specified in this description can also be implemented over a wired or wireless network connection and each of the subsystems, including the one or more processors 1503, a mass storage device 1504, an operating system 1505, software 1506, data 1507, a network adapter 1508, the system memory 1512, an Input/Output Interface 1510, a display adapter 1509, a display device 1511, and a human-machine interface 1502, can be contained within one or more remote computing devices 1514$a,b,c$ at physically separate locations, connected through buses of this form, in effect implementing a fully distributed system.

The computer 1501 typically comprises a variety of computer-readable media. Exemplary readable media can be any available media that is accessible by the computer 1501 and comprises, for example and not meant to be limiting, both volatile and non-volatile media, removable and non-removable media. The system memory 1512 comprises computer readable media in the form of volatile memory, such as random access memory (RAM), and/or non-volatile memory, such as read only memory (ROM). The system memory 1512 typically contains data such as the data 1507 and/or program modules such as the operating system 1505 and the software 1506 that are immediately accessible to and/or are presently operated on by the one or more processors 1503.

In another aspect, the computer 1501 can also comprise other removable/non-removable, volatile/non-volatile computer storage media. By way of example, FIG. 15 illustrates the mass storage device 1504 which can provide non-volatile storage of computer code, computer readable instructions, data structures, program modules, and other data for the computer 1501. For example and not meant to be limiting, the mass storage device 1504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1504, including by way of example, the operating system 1505 and the software 1506. Each of the operating system 1505 and the software 1506 (or some combination thereof) can comprise elements of the programming and the software 1506. The data 1507 can also be stored on the mass storage device 1504. The data 1507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In an aspect, the software 1506 can comprise one or more of a script engine, a logical inference engine, a calculation engine, an extension engine, and/or a rendering engine. In an aspect, the software 1506 can comprise an external engine and/or an interface to the external engine.

In another aspect, the user can enter commands and information into the computer 1501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1503 via the human-machine interface 1502 that is coupled to the system bus 1513, but can be connected by other interface and bus structures, such as a parallel port, game port, an IEEE 1394 Port (also known as a Firewire port), a serial port, or a universal serial bus (USB).

In yet another aspect, the display device 1511 can also be connected to the system bus 1513 via an interface, such as the display adapter 1509. It is contemplated that the computer 1501 can have more than one display adapter 1509 and the computer 1501 can have more than one display device 1511. For example, the display device 1511 can be a monitor, an LCD (Liquid Crystal Display), or a projector. In addition to the display device 1511, other output peripheral devices can comprise components such as speakers (not shown) and a printer (not shown) which can be connected to the computer 1501 via the Input/Output Interface 1510. Any step and/or result of the methods can be output in any form to an output device. Such output can be any form of visual representation, including, but not limited to, textual, graphical, animation, audio, tactile, and the like. The display device 1511 and computer 1501 can be part of one device, or separate devices.

The computer 1501 can operate in a networked environment using logical connections to one or more remote computing devices 1514*a,b,c*. By way of example, a remote computing device can be a personal computer, portable computer, smartphone, a server, a router, a network computer, a peer device or other common network node, and so on. Logical connections between the computer 1501 and a remote computing device 1514*a,b,c* can be made via a network 1515, such as a local area network (LAN) and/or a general wide area network (WAN). Such network connections can be through the network adapter 1508. The network adapter 1508 can be implemented in both wired and wireless environments. In an aspect, one or more of the remote computing devices 1514*a,b,c* can comprise an external engine and/or an interface to the external engine.

For purposes of illustration, application programs and other executable program components such as the operating system 1505 are illustrated herein as discrete blocks, although it is recognized that such programs and components reside at various times in different storage components of the computing device 1501, and are executed by the one or more processors 1503 of the computer. An implementation of the software 1506 can be stored on or transmitted across some form of computer-readable media. Any of the disclosed methods can be performed by computer readable instructions embodied on computer-readable media. Computer-readable media can be any available media that can be accessed by a computer. By way of example and not meant to be limiting, computer-readable media can comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method comprising:
   determining, based on undetermined query information, one or more data constraints and one or more data analysis models;
   determining, based on the one or more data constraints, an aggregated dataset;
   determining, based on an amount of correspondence between a plurality of portions of data of the aggregated dataset and a plurality of elements of each of the one or more data analysis models, a data analysis model of the one or more data analysis models associated with a highest amount of correspondence;
   and
   causing an output of the data analysis model associated with the highest amount of correspondence.

2. The method of claim 1, wherein the undetermined query information comprises one or more of imprecise query information, undefined query information, incomplete query information, partially expressed query information, or portioned query information.

3. The method of claim 1, wherein the one or more data constraints comprise one or more temporal data constraints, logical data constraints, or data-type constraints.

4. The method of claim 1, wherein determining the one or more data constraints comprises mapping one or more textual elements of the undetermined query information to the one or more data constraints.

5. The method of claim 1, wherein the one or more data analysis models comprise one or more of: a data chart, a data table, a data graph, a data map, or key performance indicators (KPIs).

6. The method of claim 1, wherein determining the aggregated dataset comprises applying the one or more data constraints to an aggregation function.

7. The method of claim 1, further comprising:
determining that the data analysis model associated with the highest amount of correspondence comprises elements of the plurality of elements that do not correspond to one or more portions of the plurality of portions of data of the aggregated dataset.

8. The method of claim 7, further comprising:
determining, based on the one or more data constraints, another aggregated dataset, wherein the another aggregated dataset comprises one or more portions of data that correspond to one or more elements of the plurality of elements of the optimal data analysis model, and wherein the aggregated dataset is based on data from a first source and the another aggregated dataset is based on data from a source that differs from the first source.

9. The method of claim 8, wherein the first source comprises an in-memory data store, and wherein the source that differs from the first source comprises one or more of an external engine or a public domain.

10. The method of claim 8, wherein determining the another aggregated dataset comprises applying the one or more data constraints to an aggregation function.

11. A non-transitory computer-readable medium storing processor-executable instructions that, when executed by at least one processor, cause the at least one processor to:
determine, based on undetermined query information, one or more data constraints and one or more data analysis models;
determine, based on the one or more data constraints, an aggregated dataset;
determine, based on an amount of correspondence between a plurality of portions of data of the aggregated dataset and a plurality of elements of each of the one or more data analysis models, a data analysis model of the one or more data analysis models associated with a highest amount of correspondence; and
cause an output of the data analysis model associated with the highest amount of correspondence.

12. The non-transitory computer-readable medium of claim 11, wherein the undetermined query information comprises one or more of imprecise query information, undefined query information, incomplete query information, partially expressed query information, or portioned query information.

13. The non-transitory computer-readable medium of claim 11, wherein the one or more data constraints comprise one or more temporal data constraints, logical data constraints, or data-type constraints.

14. The non-transitory computer-readable medium of claim 11, wherein the processor-executable instructions that cause the at least one processor to determine the one or more data constraints further cause the at least one processor to map one or more textual elements of the undetermined query information to the one or more data constraints.

15. The non-transitory computer-readable medium of claim 11, wherein the one or more data analysis models comprise one or more of: a data chart, a data table, a data graph, a data map, or key performance indicators (KPIs).

16. The non-transitory computer-readable medium of claim 11, wherein the processor-executable instructions that cause the at least one processor to determine the aggregated dataset further cause the at least one processor to apply the one or more data constraints to an aggregation function.

17. The non-transitory computer-readable medium of claim 11, wherein the processor-executable instructions further cause the at least one processor to:
determine that the data analysis model associated with the highest amount of correspondence comprises elements of the plurality of elements that do not correspond to one or more portions of the plurality of portions of data of the aggregated dataset.

18. The non-transitory computer-readable medium of claim 17, wherein the processor-executable instructions further cause the at least one processor to:
determine, based on the one or more data constraints, another aggregated dataset, wherein the another aggregated dataset comprises one or more portions of data that correspond to one or more elements of the plurality of elements of the optimal data analysis model, and wherein the aggregated dataset is based on data from a first source and the another aggregated dataset is based on data from a source that differs from the first source.

19. The non-transitory computer-readable medium of claim 18, wherein the first source comprises an in-memory data store, and wherein the source that differs from the first source comprises one or more of an external engine or a public domain.

20. The non-transitory computer-readable medium of claim 18, wherein the processor-executable instructions that cause the at least one processor to determine the another aggregated dataset further cause the at least one processor to apply the one or more data constraints to an aggregation function.

* * * * *